(12) United States Patent
Klein et al.

(10) Patent No.: US 12,202,621 B2
(45) Date of Patent: Jan. 21, 2025

(54) HYBRID MULTIROTOR PROPULSION SYSTEM FOR AN AIRCRAFT WITH POWER MANAGEMENT UNIT TO CAUSE TOTAL MECHANICAL POWER TO SPLIT AND AGGREGATE TO DRIVE PROPELLER

(71) Applicant: StratoWave Connect j.d.o.o., Zagreb (HR)

(72) Inventors: Vilko Klein, Zagreb (HR); Jasmin Juranic, Bjelovar (HR); Josip Kovac Levantin, Zagreb (HR); Ivan Nikolic, Zagreb (HR)

(73) Assignee: StratoWave Connect j.d.o.o. (HR)

( * ) Notice: Subject to any disclaimer, the term of this patent is extended or adjusted under 35 U.S.C. 154(b) by 283 days.

(21) Appl. No.: 17/763,408

(22) PCT Filed: Sep. 15, 2020

(86) PCT No.: PCT/EP2020/075728
§ 371 (c)(1),
(2) Date: Jul. 8, 2022

(87) PCT Pub. No.: WO2021/058329
PCT Pub. Date: Apr. 1, 2021

(65) Prior Publication Data
US 2022/0324580 A1    Oct. 13, 2022

(30) Foreign Application Priority Data

Sep. 25, 2019   (EP) ..................................... 19199563

(51) Int. Cl.
*B64D 35/023*    (2024.01)
*B64C 27/32*    (2006.01)
(Continued)

(52) U.S. Cl.
CPC ............ *B64D 35/023* (2024.01); *B64C 27/32* (2013.01); *B64D 31/18* (2024.01); *B64D 35/04* (2013.01)

(58) Field of Classification Search
CPC ...... B64D 27/026; B64D 27/02; B64D 35/02; B64D 35/023; B64D 35/024; B64D 35/025; B64D 35/026; B64D 35/08
See application file for complete search history.

(56) References Cited

U.S. PATENT DOCUMENTS

2012/0025032 A1* 2/2012 Hopdjanian ............ B60L 50/61
903/905
2016/0207625 A1   7/2016 Judas
(Continued)

FOREIGN PATENT DOCUMENTS

WO       2018/193522 A1   4/2017

OTHER PUBLICATIONS

Anonymous; BMW Introduces Intelligent Alternator Control with Regenerative Braking Reduces Fuel Consumption by About 4%; Sep. 29, 2006; https://www.greencarcongress.com/2006/09/bmc_introduces_.html.
(Continued)

*Primary Examiner* — Joshua J Michener
*Assistant Examiner* — Arfan Y. Sinaki
(74) *Attorney, Agent, or Firm* — McGarry Bair PC

(57) ABSTRACT

A hybrid multirotor propulsion system for an aircraft includes a plurality of propulsion units, each propulsion unit having a propeller, an electromotor and a peripheral differential gearbox; a plurality of driving elements, each of which is coupled to a respective one of the plurality of propulsion units; a mechanical power source; a main distributor gearbox; at least one electric machine; and a power management unit. The power management unit is configured according to (Continued)

a predetermined operating mode, which causes the mechanical power source to output first and second mechanical power components; and distributing the first mechanical power component to provide each driving element with a direct mechanical propeller power; and causes the electric machine to convert the second mechanical power component into electric power, part of which provides each electromotor with an electric propeller power. The direct mechanical propeller power causes each electromotor to convert the electric propeller power into an indirect mechanical propeller power, outputted to the peripheral differential gearbox; and causes the peripheral differential gearbox of each propulsion unit to aggregate the direct mechanical propeller power and the indirect mechanical propeller power to a total mechanical propeller power which drives the propeller of each propulsion unit.

20 Claims, 16 Drawing Sheets

(51) Int. Cl.
 B64D 31/18 (2024.01)
 B64D 35/04 (2006.01)

(56) References Cited

U.S. PATENT DOCUMENTS

| | | | |
|---|---|---|---|
| 2017/0253331 A1 | 9/2017 | Nakashima | |
| 2018/0283292 A1 | 10/2018 | Steinwandel | |
| 2018/0319283 A1 | 11/2018 | Battin | |
| 2019/0061924 A1 | 2/2019 | Kita | |
| 2019/0118935 A1 | 4/2019 | Love | |
| 2019/0118943 A1* | 4/2019 | Machin | B64C 29/02 |
| 2019/0322366 A1* | 10/2019 | Gaffney | B64C 3/16 |
| 2019/0322379 A1* | 10/2019 | Mackin | B64D 27/10 |
| 2020/0062414 A1* | 2/2020 | Hon | B60W 10/06 |
| 2020/0063599 A1* | 2/2020 | Waun | F01D 21/14 |
| 2020/0079521 A1* | 3/2020 | Latulipe | H02K 19/34 |
| 2020/0148376 A1* | 5/2020 | Kawai | B64D 27/10 |

OTHER PUBLICATIONS

Daniel Cross; Basic Understanding of STARS (Stop-start Alternator Reversible System)—Professional Motor Mechanic; Jul. 13, 2017; https://pmmonline.co.uk/technical/basic-understanding-stars/.

* cited by examiner

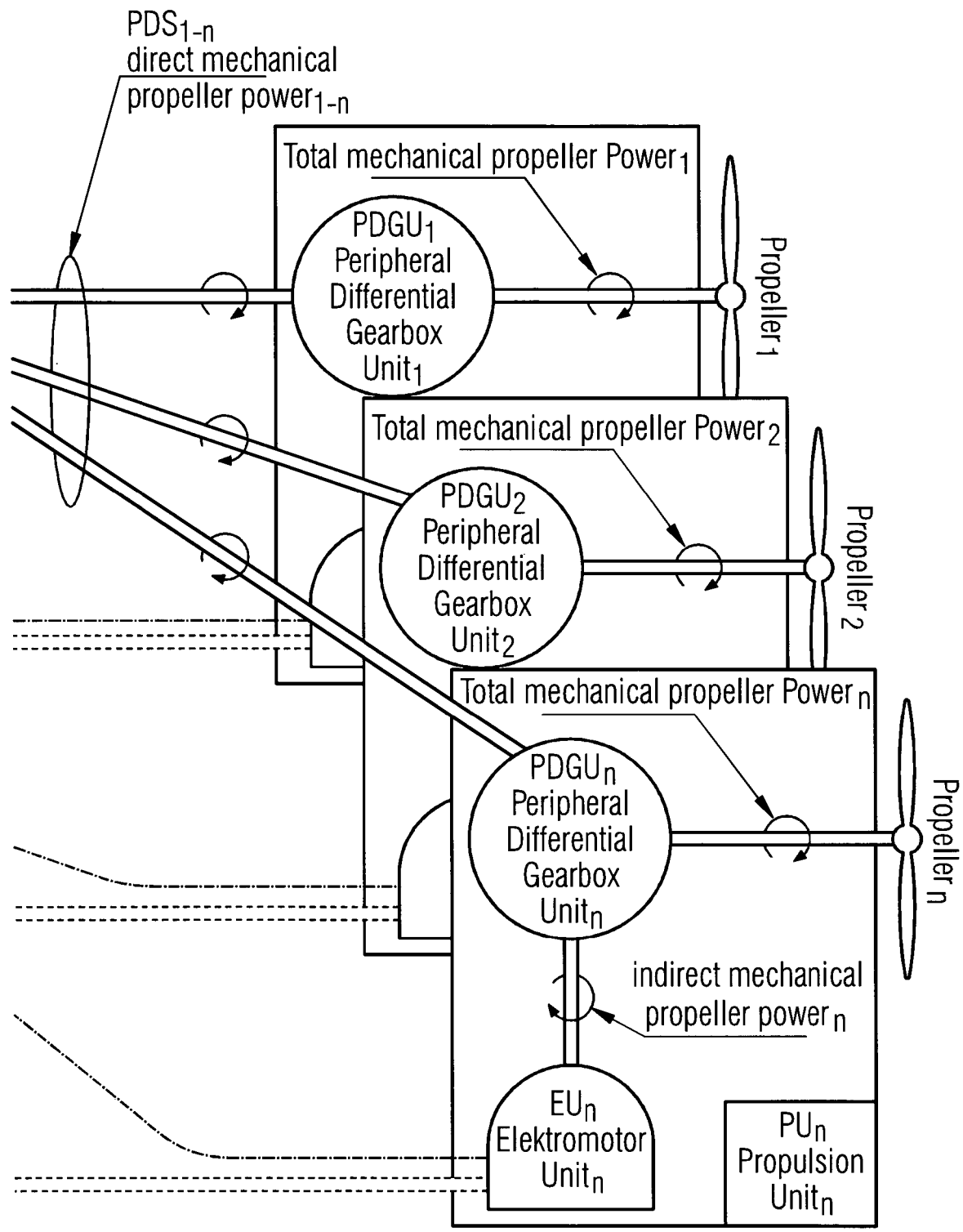
continuation of FIG. 1

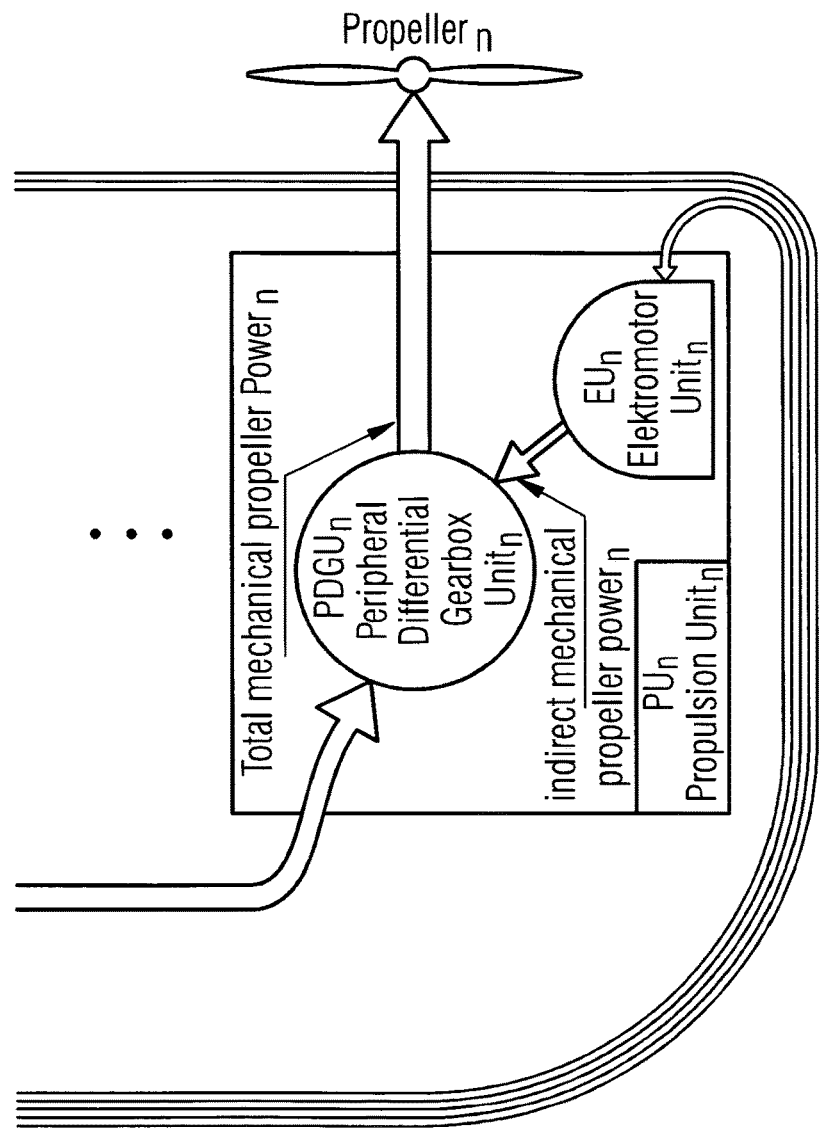
continuation of FIG. 2 a) EM to MPS back shaft

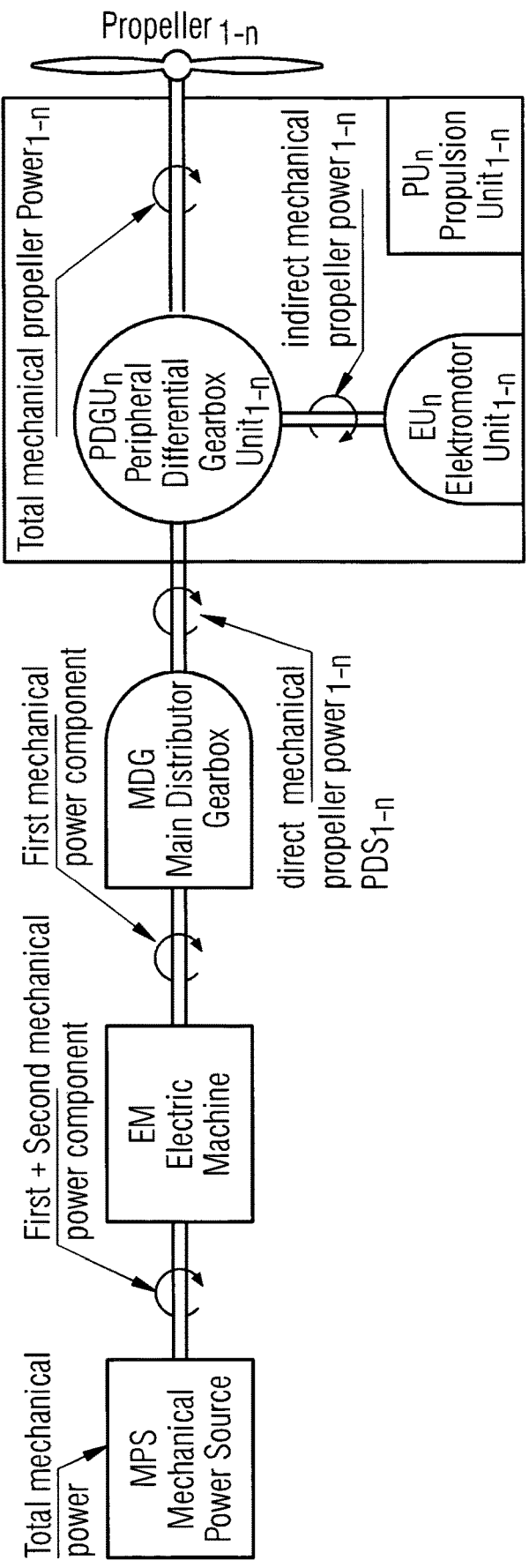
continuation of FIG. 8

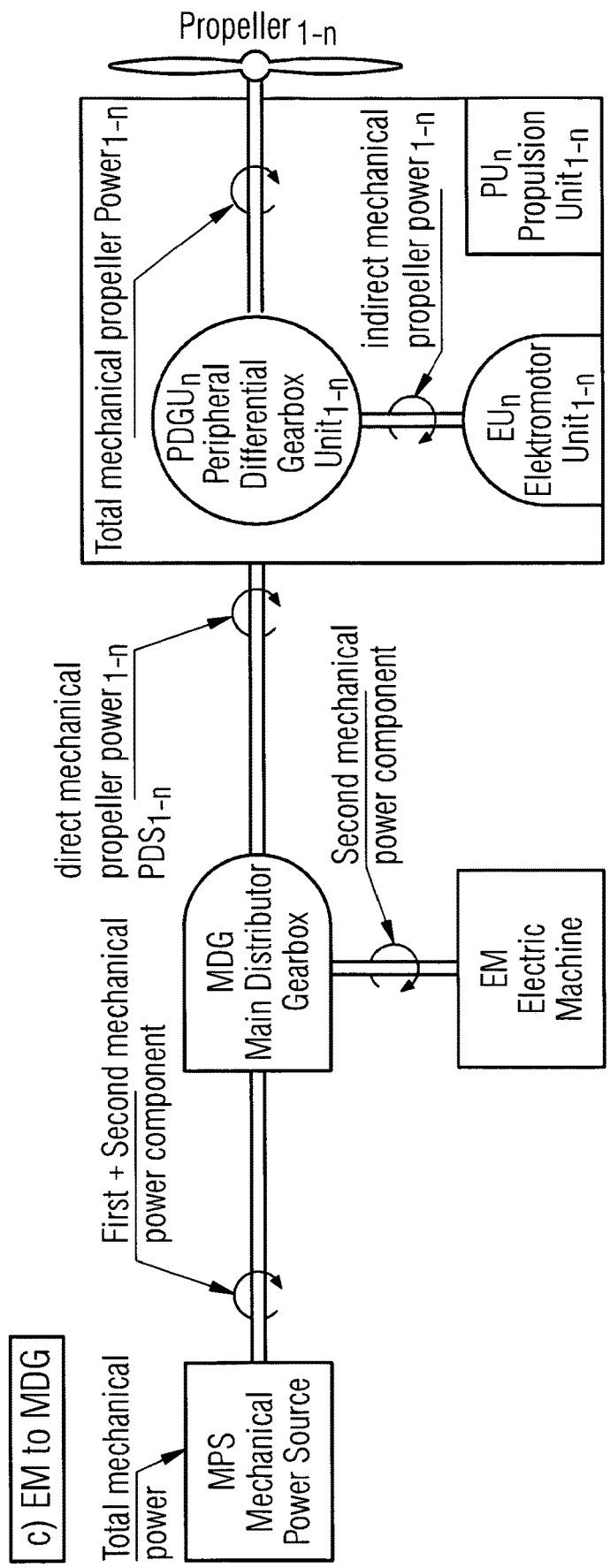
continuation of FIG. 8
c) EM to MDG

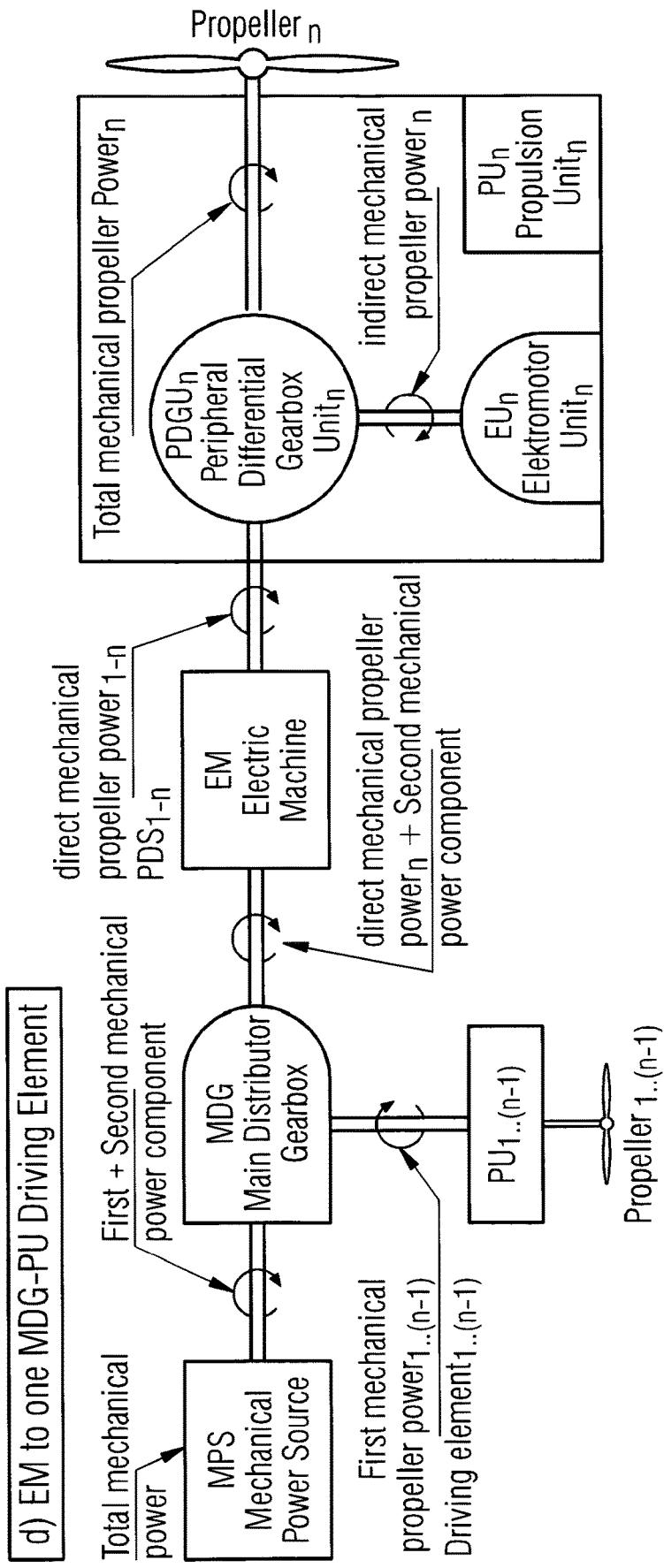
continuation of FIG. 8
d) EM to one MDG-PU Driving Element

HYBRID MULTIROTOR PROPULSION SYSTEM FOR AN AIRCRAFT WITH POWER MANAGEMENT UNIT TO CAUSE TOTAL MECHANICAL POWER TO SPLIT AND AGGREGATE TO DRIVE PROPELLER

CROSS-REFERENCE TO RELATED APPLICATIONS

This application is a National Phase of International Application No. PCT/EP2020/075728, filed Sep. 15, 2020, which claims the benefit of European Application 19199563.8, filed Sep. 25, 2019, both of which are incorporated herein in their entireties.

TECHNICAL FIELD

The present invention relates to a hybrid multirotor propulsion system for an aircraft comprising a plurality of propulsion units. Further, the present invention relates to a method for controlling power in a hybrid multirotor propulsion system of an aircraft.

BACKGROUND

The overall development trend of transport technology can be seen in a transition to hybrid and fully electric vehicles. While this has been made possible to a large extent for road transport, this task is a more difficult one in aeronautical technology. In the aeronautical transport segment there are some early prototype concepts providing fully electrical wing-type aircrafts with a short-range ability of approximately 1000 km. In this context, a related issue is the energy storage using a secondary, i.e. rechargeable battery having a weight in the amount of e.g. 60% of the maximum take-off weight.

The assumption is that full transition to electrical aircraft of any type shall be a long-term process. Meanwhile, hybrid propulsion systems shall be used combining a conventional internal combustion engine system with an electric propulsion system. In this respect, it is to be noted that single-motor aircrafts as helicopters or multirotor aircrafts as drones require more power/energy stored for their propulsion than wing-type aircrafts.

The latest aeronautical technology applying the multirotor aircraft type is widely accepted because of its abilities in terms of vertical take-off and landing, easiness of use and small dimensions. Thus, smaller unmanned aerial systems based on multirotor technology are considered common and economically accessible to a wider community of users. Modern secondary batteries with a specific gravimetric energy of approximately 200 Wh/kg provide flight autonomy for multirotor aircrafts with additional payload in a range of 15 to 30 minutes. Realistically, it may be expected that secondary batteries with double capacity should be available in the next five years so that flight autonomy may be increased up to 30 to 60 minutes. Further, there are some concepts which use relatively large propellers for relatively low weight multirotors and trade payload for battery weight. Such concepts might achieve flight autonomy over 1.5 hours of fully electrically powered flight. However, using long propellers in relation to relatively low weight renders those systems unstable during flight operations especially when turbulences occur.

In order to prolong flight autonomy, modern systems generally apply two basic hybrid concepts, namely indirect hybrid propulsion and direct hybrid propulsion. Both concepts utilize an internal combustion engine as well as an electromotor for outputting mechanical power and electric power, respectively, to an individual propeller. However, a fundamental difference between these two basic concepts may be seen in the fact whether or not mechanical power output by an internal combustion engine is converted into electric power before being utilized for driving the propeller. Thus, an indirect hybrid multirotor propulsion system is provided with a power chain comprising a plurality of components interacting with each other to convert the mechanical power delivered by an internal combustion engine into electric power which can then be used by an electromotor for driving the propeller. In contrast, in a direct hybrid multirotor propulsion system, the mechanical power generated by an internal combustion engine is directly transmitted to the propeller without first being converted into electric power and then back into mechanical power. Accordingly, the power converting components of an indirect propulsion system can be dispensed with in a direct propulsion system.

A major drawback of the indirect hybrid propulsion concept is the power loss occurring in the power chain due to energy conversion. Thus, total power efficiency of the system is obtained by multiplying the individual power efficiencies assigned to the individual components of the power chain. Exemplarily assuming a power chain being composed of six individual components, namely an internal combustion engine, a generator, a voltage rectifier, a voltage regulator, an electronic speed controller, and a brushless direct current electrical motor in connection with a propeller, multiplying as much as six individual power efficiencies result in a drastic decline of total efficiency.

In comparison, direct hybrid multirotor propulsion systems use a configuration in which an internal combustion engine is directly coupled to the shaft of an individual propeller (wherein an electromotor is coupled on the same shaft). Thus, there is no power chain for implementing power conversion with respect to the mechanical power supplied by the internal combustion engine, and the decline of efficiency is significantly smaller. However, as a multirotor aircraft requires a plurality of propulsion units, a corresponding number of internal combustion engines is needed in a direct propulsion system resulting in increased costs for producing and maintaining the system. Another issue is that the weight of the system is distributed away from the center of gravity rendering flight operations more difficult. For instance, more sudden changes of rotational speed may be required to keep attitude control so that efficiency is decreased and energy consumption is increased.

SUMMARY

In view of the above issues, an object of the present invention is to provide a hybrid multirotor propulsion system having high efficiency at low manufacturing and maintenance costs.

The afore-mentioned object is achieved by a hybrid multirotor propulsion system for an aircraft according to claim 1. Advantageous embodiments are defined in the dependent claims and the following description.

The hybrid multirotor propulsion system according to the present invention comprises a plurality of propulsion units, each propulsion unit comprising a propeller, an electromotor and a peripheral differential gearbox; a plurality of driving elements, each of which being coupled to a respective one of said plurality of propulsion units; a mechanical power source; a distributor gearbox; at least one electric machine;

and a power management unit. In a predetermined operating mode, the power management unit is configured to cause said mechanical power source to output total mechanical power and to cause said total mechanical power to be split into first and second mechanical power components; to cause said distributor gearbox to distribute said first mechanical power component to said plurality of driving elements for providing each driving element with a direct mechanical propeller power; to cause said electric machine to convert said second mechanical power component into electric power and to cause at least a part of said electric power to be distributed to said plurality of electromotors for providing each electromotor with an electric propeller power; to cause each driving element to output said direct mechanical propeller power to said peripheral differential gearbox of said propulsion unit to which said driving element is coupled; to cause each electromotor to convert said electric propeller power into an indirect mechanical propeller power and to output said indirect mechanical propeller power to said peripheral differential gearbox of said propulsion unit comprising said electromotor; to cause said peripheral differential gearbox of each propulsion unit to aggregate said direct mechanical propeller power and said indirect mechanical propeller power to a total mechanical propeller power and to drive said propeller of each propulsion unit based on said total mechanical propeller power.

The present invention provides an innovative multirotor propulsion system making use of the benefits of both direct and indirect multirotor propulsion system concepts while avoiding their respective disadvantages. Thus, the total mechanical power provided by the mechanical power source is split into first and second mechanical power components before utilizing the first mechanical power component in accordance with a direct propulsion concept and utilizing the second mechanical power component in accordance with an indirect propulsion concept. Specifically, the first mechanical power component is directly output to the plurality of propellers without any power conversion, i.e. without being converted into electric power and then converted back into mechanical power. In contrast, the second mechanical power component is indirectly output to the plurality of propellers using power conversion. More concretely, the second mechanical power component is transmitted in form of electric power generated by the electric machine and then distributed to the plurality of electromotors converting the electric power back into mechanical power which is finally supplied to respective propellers.

In order to drive each propeller as described above, the power management unit controls each propulsion unit such that the peripheral differential gearbox included therein combines the direct mechanical propeller power, i.e. a power generated without power conversion, and the indirect mechanical propeller power, i.e. a power generated by applying a power conversion, to a total mechanical propeller power. Preferably, the power management unit is configured to control each peripheral differential gearbox based on a variable ratio of direct and indirect mechanical propeller powers. The aforementioned ratio may be varied as needed, e.g. depending on flight conditions.

The splitting ratio between the first and second mechanical power components may be controlled in such a way that a major part of the total mechanical power generated by the mechanical power source is utilized for directly driving the plurality of propellers, whereas a minor part of the total mechanical power is utilized to indirectly drive the propellers via the respective electromotors. In other words, the first mechanical power component is preferably larger than the second mechanical power component. Adjusting the splitting ratio in such a way enables the hybrid multirotor propulsion system to use as much as possible of the raw power provided by the mechanical power source for directly driving the propellers which is advantageous in terms of energy consumption. Thus, by avoiding any energy/power conversion when transmitting mechanical power from the mechanical power source to the respective propeller, a highly efficient power transmission is achieved which results in low energy consumption.

This is all the more true in case that one or more internal combustion engines (ICE) are used as mechanical power source. Thus, an ICE fuel system stores much more specific energy than any other type of energy carrier, in particular a conventional battery suitable for hybrid propulsion systems. In particular, the quantity of fuel consumed by mechanical power source is able to provide several times more energy than a pure electrical system of the same weight.

On the other hand, while an ICE is powerful and provides a large amount of stored energy for flight operations, a system utilizing ICE power for directly driving a propeller may have the disadvantage of a slow response to sudden changes in rotational speed of the propeller. Therefore, the present invention proposes to utilize the second mechanical power component, which is converted into electric power, for controlling the electromotor of the respective propulsion unit. Accordingly, each propeller is enabled to constantly calibrate its rotational speed individually by means of the respective electromotor while simultaneously consuming as much as possible of the required mechanical power directly from the ICE.

As the mechanical power source is operatively connected to all propulsion units, it is possible to use a single power source for driving all propellers. Thus, in comparison to conventional direct hybrid multirotor propulsion systems comprising a plurality of ICEs, the present invention allows to reduce manufacturing and maintaining costs. Further, by providing only one single mechanical power source, the weight of the system can be concentrated close to the center of gravity avoiding any difficulties in flight operations. As a result, sudden changes of rotational speed required to counter such difficulties may be reduced improving efficiency in terms of energy consumption.

As already mentioned above, the mechanical power source may comprise a single or a plurality of internal combustion engines providing raw mechanical power. In case of multiple engines, the engines may be coupled through a differential gearbox to an output power shaft. The mechanical power source is operated under control of the power management unit.

The distributor gearbox may be coupled via the plurality of driving elements to the plurality of propulsion units, in particular to the plurality of peripheral differential gearbox units included in the propulsion units. Thus, the driving elements are used to couple the first mechanical power component from the distributor gearbox to the plurality of propulsion units. Any type of driving element may be used, e.g. a drive shaft, a transmission belt or a transmission chain.

Each propulsion unit comprises the respective propeller, the respective electromotor and the respective differential gearbox. Each propeller acts as the final mechanical load in the respective power chain starting from the mechanical power source. Main function of the propeller is to provide thrust by converting the total mechanical propeller power output by the respective peripheral differential gearbox. A side effect of the propeller rotation may be seen in creating torque which is required for multirotor yaw control.

The power management unit may be configured to control overall operation of the hybrid multirotor propulsion system. In particular, the power management unit controls and regulates power among all power/energy dependent components such as the mechanical power source, the electric machine, the electromotors included in the propulsion units, rechargeable electric power banks etc. The power management unit serves to increase or decrease power for each particular unit during short-, mid- and long-term operational cycles by keeping these units in optimal operation requirements.

Preferably, the hybrid multirotor propulsion system comprises an electrical energy storing device which is connected to the electric machine and to the plurality of electromotors. The electrical energy storing device may be formed by a rechargeable electric power bank. The power management unit may be configured to cause the electrical energy storing device to store the electric power generated by the electric machine and to distribute at least a part of the stored electric power to the plurality of electromotors.

For instance, the electrical energy storing device may comprise at least one capacitor unit and/or at least one rechargeable electric battery. The capacitor unit may be formed by a supercapacitor having a capacitance value much higher than capacitors of another type. Such a supercapacitor bridges the gap between electrolytic capacitors and rechargeable batteries. Thus, a supercapacitor stores much more energy than electrolytic capacitors, accepts and delivers charge much faster than batteries and tolerates more charge and discharge cycles than rechargeable batteries. The capacitor unit may act as electrical energy buffer between the electric machine and the electromotors included in the propeller units. It may provide a shorter period of electromotor operation while being provided with a constant charging current from the electric machine. In practical implementation, the capacitor unit may be kept charged to some empirical value e.g. in a range of 60% to 80% of maximum charge, trying to maintain an intermediate value of e.g. 70% charge as close as possible. For instance, it may be assumed that the capacitor unit should be able to provide constant charging current for 10 seconds of multirotor operations while charge level should drop from 80% to 60%. The power management unit may be configured to regulate the process for charging the capacitor unit in accordance with PID control. Further, the capacitor unit may be able to supply power demands from the electromotor of the respective propulsion unit. In particular, in case of a sudden request for additional power, the respective electromotor shall not pull power from the electric machine but from the capacitor unit or from the rechargeable battery.

Likewise, the electrical energy storing device may act as an electrical energy buffer. This applies e. g. when starting the mechanical power source. Further, the rechargeable electric power bank may be used as electrical energy buffer for filling electrical energy gaps when the electric machine is insufficient to provide energy to the respective electromotor during standard operation of the propeller. In addition, the rechargeable electric power bank may be used for powering the respective electromotor in case of a failure of the mechanical power source. Further, the rechargeable electric power bank may store short energy peaks which cannot be stored anywhere else in the hybrid multirotor propulsion system.

Preferably, a plurality of rechargeable units of different types are used in order to exploit the benefits of the different units while avoiding their respective disadvantages. For example, a supercapacitor has the advantage that the exact voltage is not a constraint in its operational cycle so that voltage regulation is not required. In contrast, voltage regulation is necessary in case of a LiPo battery or any other rechargeable battery. In the latter case, the regulated voltage depends on the charging state, and voltage regulation increases energy losses of least 20% to 30%. On the other hand, Li- and LiPo-batteries have high specific power gravimetric densities of up to approximately 200 Wh/kg while typical supercapacitors have significantly lower values of only 3 to 6 Wh/kg.

The at least one electric machine may be provided anywhere in the power transmission line between the mechanical power source and the electromotor of the respective propulsion unit. Hereinafter, some exemplary options are mentioned for positioning the electric machine within the system.

Optionally, the mechanical power source may comprise first and second power outputs, wherein the power management unit is configured to cause the mechanical power source to output the first mechanical power component from the first power output to the distributor gearbox and to cause the mechanical power source to output the second mechanical power component from the second power output to the electric machine. According to this option, the distributor gearbox and the electric machine are coupled to different power outputs of the mechanical power source.

According to another option, the mechanical power source may comprise a single power output, wherein the power management unit is configured to cause the mechanical power source to output the total mechanical power from that single power output either to the distributor gearbox or the electric machine. The power management unit is further configured to cause the component receiving the total mechanical power, i.e. the distributor gearbox or the electric machine, to split the total mechanical power into the first and second mechanical power components. According to this option, the electric machine may be located between the mechanical power source and the distributor gearbox, or it may be coupled to the distributor gearbox which is connected to the mechanical power source.

According to another option, the electric machine may be coupled to one of a plurality of power outputs of the distributor gearbox, each of these power outputs of the distributor gearbox being connected to a respective one of the plurality of drive elements. In this option, the electric machine is provided in a single power transmission line between the distributor gearbox and one of the propulsion units.

The afore-mentioned options are to be understood only as examples. Thus, an electric machine may be mechanically coupled anywhere from the power output of the mechanical power source up to the power input coupled to the peripheral differential gearbox of the respective propulsion unit.

The above explanations mainly refer to a predetermined operating mode which may be a standard hybrid power mode in which the power management unit is configured to cause the electric machine to be operated in the generator mode. The standard hybrid power mode is a continuous power mode. The hybrid multirotor propulsion system may further comprise a boost hybrid power mode being a short term operating mode which differs from the standard hybrid power mode in that the power management unit is configured to cause the second mechanical power component to be zero and the electric machine to be operated in an idle mode. Accordingly, the electric machine does not generate electric power in the boost hybrid power mode. In other words, the electric machine does not transform any of the total mechanical power provided by the mechanical power source into electric power so that the total mechanical power is fully available for mechanical transmission up to the peripheral differential gearbox of the respective propulsion unit. Further, the plurality of electromotors included in the plurality of propulsion units are electrically powered by the electrical energy storing device.

Further, the hybrid multirotor propulsion system may comprise a total boost hybrid power mode being a short term operating mode which differs from the standard hybrid power mode in that the power management unit causes the second mechanical power component to be zero and the electric machine to be operated in the electromotor mode for providing additional mechanical power increasing the first mechanical power component. Accordingly, whereas in the boost hybrid power mode the electric machine is at least nearly in an idle mode so that it essentially does not generate any power, the electric machine operates as an electromotor in the total boost hybrid power mode in order to generate additional power which can be injected into the direct mechanical transmission line from the mechanical power source to the peripheral differential gearbox of the respective propulsion unit. Accordingly, it is possible to maximize the total mechanical propeller power for driving the propeller of the propulsion unit. Both the electric machine and the electromotors of the propulsion units may utilize electric power which is mainly provided by the rechargeable electric power bank.

According to a further advantageous embodiment, the hybrid multirotor propulsion system comprises a start power mode in which the power management unit is configured to operate the electric machine in the electromotor mode to output mechanical starting power for starting the mechanical power source. In other words, the electric machine may be used as a starter for the mechanical power source. The electric power for implementing this starting function may be provided by the rechargeable electric power bank.

According to a further embodiment, a mechanical power failure mode may be provided in which the power management unit is configured to cause the electrical energy storing device to output electric power to the plurality of electromotors of the propulsion units. The mechanical power failure mode serves to implement an emergency operation in case of engine failure. In such a case, the electromotors provided in the propulsion units take over full propulsion demands. For this, the electromotors are electrically powered by the electrical energy storing device, in particular the rechargeable electric power bank.

Preferably, the main distributor gearbox comprises a root gearbox which has gearbox input coupled to the mechanical power source and a plurality of gearbox outputs, each of which being directly or indirectly coupled to a respective one of said plurality of driving elements. In case of directly coupling the gearbox outputs of the root gearbox to the driving elements, the main distributor gearbox may be considered to have a star-like configuration. In the present context regarding the configuration of the main distributor gearbox it is to be noted that the afore-mentioned terms "directly" and "indirectly" do not refer to any conversion of mechanical power into electric power as explained above with reference to other aspects of the present invention. Rather, these terms only refer to the fact whether or not any intermediate gear elements are provided for transferring the mechanical power generated by the root gearbox to the driving elements.

The branching level main distributor gearbox may have a branched gearbox configuration defining successive branching levels for indirectly coupling the root gearbox to the driving elements, wherein a lowest branching level is defined by the root gearbox and at least one higher branching level is defined by a plurality of secondary gearboxes. Each secondary gearbox comprises a gearbox input coupled to a respective one of the gearbox outputs assigned to a lower branching level. Further, each secondary gearbox comprises at least two gearbox outputs, each of which being coupled to a respective one of said gearbox inputs assigned to a higher branching level or being coupled to a respective one of the driving elements. According to this embodiment, the distributing gearbox may be considered to have a tree-like configuration.

According to another aspect of the present invention, a method for controlling power in a hybrid multirotor propulsion system of an aircraft is provided, wherein the hybrid multirotor propulsion system comprises a plurality of propulsion units, each propulsion unit comprising a propeller, an electromotor and a peripheral differential gearbox; a plurality of driving elements, each of which being coupled to a respective one of said plurality of propulsion units; a mechanical power source; a distributor gearbox; and at least one electric machine. The method comprises the following steps: causing the mechanical power source to output total mechanical power and splitting the total mechanical power into first and second mechanical power components; causing the distributor gearbox to distribute the first mechanical power component to the plurality of driving elements for providing each driving element with a direct mechanical propeller power; causing the electric machine to convert the second mechanical power component into electric power and distributing at least a part of the electric power to the plurality of electromotors for providing each electromotor with an electric propeller power; causing each driving element to output the direct mechanical propeller power to the peripheral differential gearbox of the propulsion unit to which the driving element is coupled; causing each electromotor to convert the electric propeller power into an indirect mechanical power and to output the indirect mechanical propeller power to the differential gearbox of the propulsion unit comprising the electromotor; and causing the peripheral differential gearbox of each propulsion unit to aggregate the direct mechanical propeller power and the indirect mechanical propeller power to a total mechanical propeller power and to drive the propeller of each propulsion unit based on the total mechanical propeller power.

BRIEF DESCRIPTION OF THE FIGURES

Hereinafter, specific embodiments are described with reference to the drawings in which.

DETAILED DESCRIPTION

Figure 1:
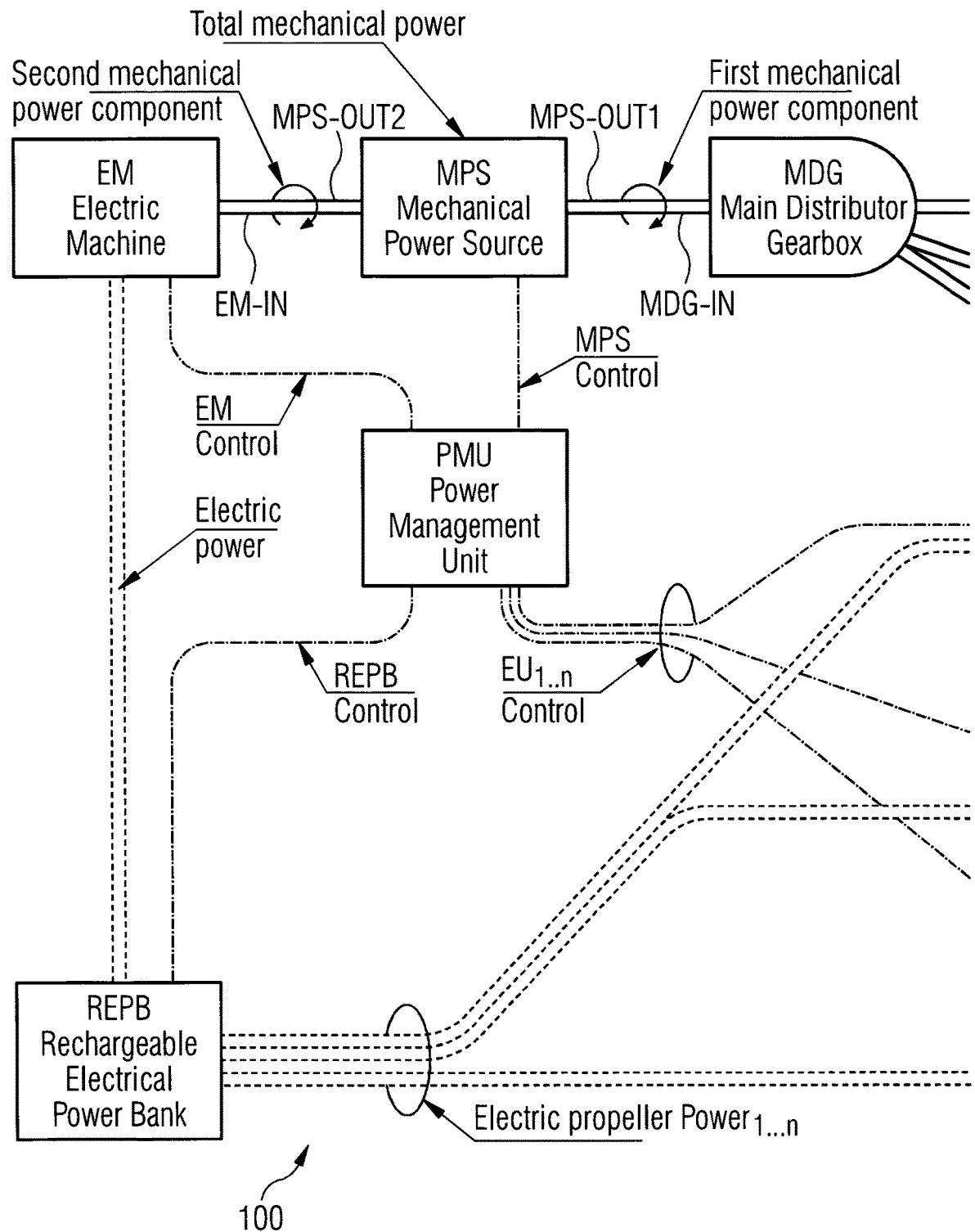
FIG. 1 is a block diagram showing a hybrid multirotor propulsion system according to an embodiment.

The block diagram according to FIG. 1 shows a hybrid multirotor propulsion system 100 according to an embodiment of the present invention. The hybrid multirotor propulsion system 100 comprises a plurality of propulsion units $PU_1, PU_2, \ldots, PU_n$, wherein each of the propulsion units $PU_1, PU_2, \ldots, PU_n$ includes a propeller, an electromotor unit $EU_1, EU_2, \ldots EU_n$, and a peripheral differential gearbox unit $PDGU_1, PDGU_2, \ldots, PDGU_n$.

The hybrid multirotor propulsion system 100 shown in FIG. 1 further comprises a mechanical power source MPS, a main distributor gearbox MDG, and an electric machine EM. The mechanical power source MPS may include one or more internal combustion engines (ICE). In the specific embodiment shown in FIG. 1, the mechanical power source MPS has a first output shaft MPS-OUT1 and a second output shaft MPS-OUT2. The mechanical power source MPS is coupled via the first output shaft MPS-OUT1 to an input shaft MDG-IN of the main distributor gearbox. Further, the mechanical power source MPS is coupled via the second output shaft MPS-OUT2 to an input shaft EM-IN of the electric machine EM. Further, the main distributor gearbox MDG comprises a plurality of output shafts $PDS_1, PDS_2, \ldots PDS_n$, each of which being coupled to a respective one of the peripheral differential gearbox units $PDGU_1, PDGU_2, \ldots, PDGU_n$. The output shafts $PDS_1$ to $PDS_n$ form driving elements which are used to drive the plurality of propellers as described below.

The hybrid multirotor propulsion system 100 shown in FIG. 1 further comprises an electrical energy storing device which may be formed by a rechargeable electric power bank REPB. The rechargeable electric power bank REPB may include e.g. at least one capacitor unit and at least one rechargeable battery. The electrical energy storing device is electrically connected to the electric machine EM and to the plurality of electromotor units $EU_1, EU_2, \ldots EU_n$.

The hybrid multirotor propulsion system 100 further comprises a power management unit PMU which may be formed by a processor, said processor being used for controlling each of the propulsion units $PU_1, PU_2, \ldots, PU_n$, in particular the electromotor units $EU_1, EU_2, \ldots EU_n$ thereof, for controlling the mechanical power source MPS, for controlling the electric machine, and for controlling the electrical energy storing device including the rechargeable electric power bank REPB.

The hybrid multirotor propulsion system 100 provides for a standard hybrid power mode in which the power management unit PMU controls powering of the plurality of propulsion units $PU_1, PU_2, \ldots, PU_n$ as explained hereinafter.

Under control of the power management unit PMU, the mechanical power source MPS operates to generate a total mechanical power being composed of a first mechanical power component output to the main distributor gearbox MDG and a second mechanical power component output to the electric machine EM. Accordingly, the power management unit PMU causes mechanical power source MPS to split the total mechanical power into the afore-mentioned first and second mechanical power components. For efficiency reasons already discussed above, the first mechanical power component is preferably larger than the second mechanical power component. Just as an example, one may assume a splitting ratio of 80% to 20%.

The main distributor gearbox MDG distributes the first mechanical power component through the driving elements $PDS_1$ to $PDS_n$ to the plurality of propulsion units $PU_1$ to $PU_n$. Specifically, each peripheral differential gearbox unit $PDGU_1$ to $PDGU_n$ receives a fraction of the first mechanical power component representing a direct mechanical propeller power. The term "direct" refers to the fact that the aforementioned fraction of the first mechanical power component is transmitted to the respective peripheral differential gearbox unit $PDGU_1$ to $PDGU_n$ without applying any conversion from mechanical to electrical and back to mechanical power.

The power management unit PMU controls the electric machine EM such that the electric machine EM converts the second mechanical power component into electric power which is output to the electrical energy storing device comprising the rechargeable electric power bank REPB. A part of the electric power generated by the electric machine EM is distributed to the plurality of electromotor units $EU_1$ to $EU_n$. Accordingly, each electromotor unit $EU_1$ to $EU_n$ is provided with electric propeller power. The electric propeller power is converted by the respective electromotor unit $EU_1$ to $EU_n$ into an indirect mechanical propeller power which is output to the corresponding peripheral differential gearbox unit $PDGU_1$ to $PDGU_n$. The term "indirect" refers here to the fact that the fraction of the second mechanical power component received by the peripheral differential gearbox unit $PDGU_1$ to $PDGU_n$ is generated by utilizing a conversion from mechanical to electric and back to mechanical power.

The peripheral differential gearbox unit $PDGU_1$ to $PDGU_n$ of the respective propulsion unit $PU_1$ to $PU_n$ aggregates the first mechanical propeller power output from the main distributor gearbox MDG and the second mechanical propeller power output by the respective electromotor unit $EU_1$ to $EU_n$ to a total mechanical propeller power and outputs this total mechanical propeller power to the propeller through an output shaft coupling the propeller to the peripheral differential gearbox unit $PDGU_1$ to $PDGU_n$.

As can be seen from the above, a major fraction of the total mechanical power generated by the mechanical power source MPS, namely the first mechanical power component is transferred from the mechanical power source MPS through the main distributor gearbox MDG and the plurality of driving elements $PDS_1$ to $PDS_n$ to the propellers of the propulsion units $PU_1$ to $PU_n$. Thus, a major part of the power transmission is implemented by means of a direct mechanical chain which is beneficial in terms of power efficiency. Thus, as explained above, ICE systems are capable to provide a higher power to weight ratio.

On the other hand, it is rather difficult to precisely control ICE systems on a level which is required for multirotor operations. Thus, multirotor operations often require rapid changes in propeller rotation during flight which is very difficult to realize by only using a direct mechanical chain. Therefore, a minor fraction of the total mechanical power generated by the mechanical power source, namely the second mechanical power component, is transferred to the propellers via an indirect mechanical chain which allows a precise control as required in multirotor operations for realizing rapid propeller rotation changes.

Figure 2:
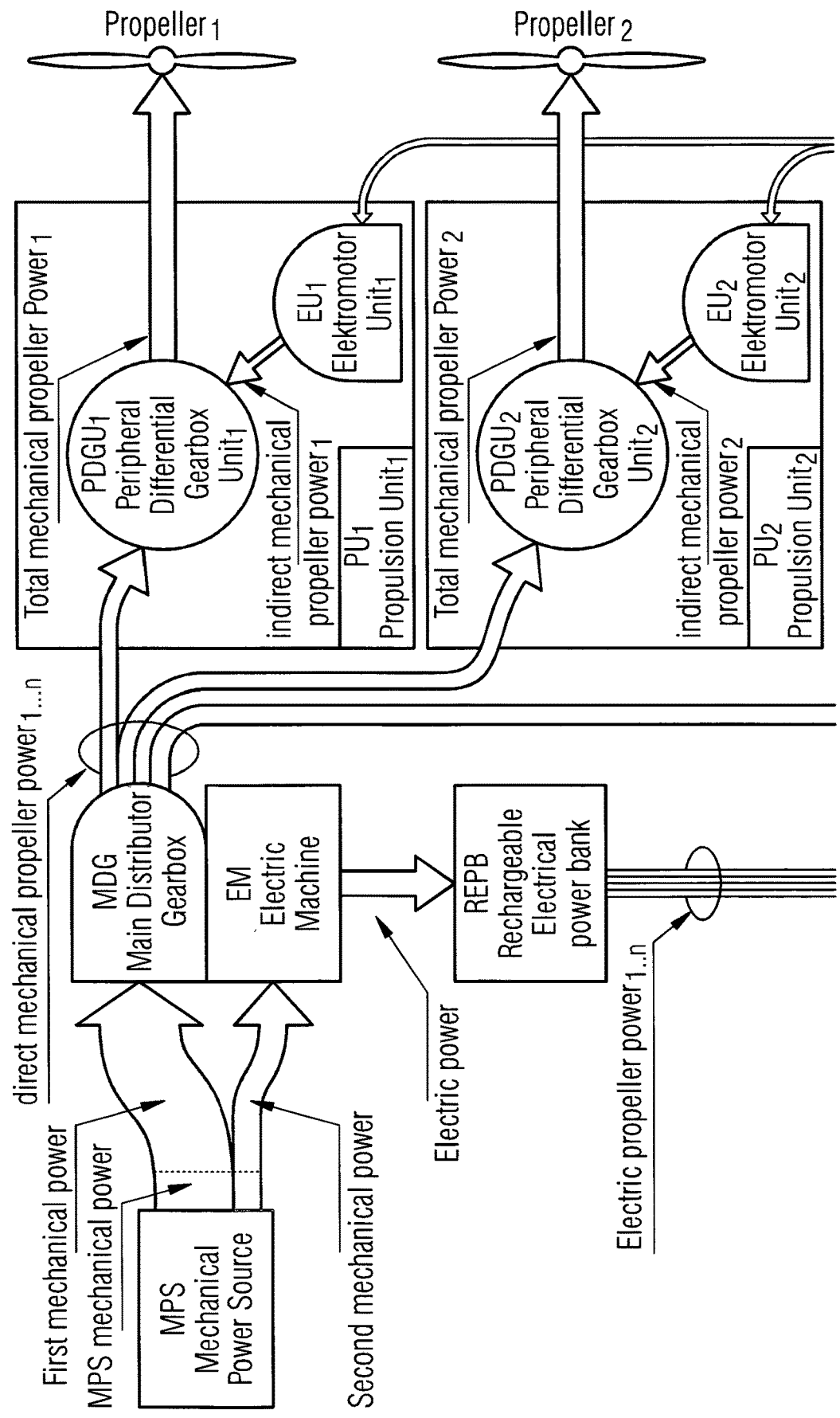
FIG. 2 is a block diagram illustrating power flows from the mechanical power source to the propellers according to the embodiment shown in FIG. 1.

The splitting into a direct and an indirect mechanical chain, is illustrated once again in the block diagram of FIG. 2. Thus, FIG. 2 shows the respective power/energy flows starting from the mechanical power source MPS.

The power control explained above refers to the standard hybrid power mode. The standard hybrid power mode is a continuous power mode in which the electric machine EM is used for converting the first mechanical power component which is utilized at least in part for establishing an indirect transmission chain. In addition to the standard hybrid power mode, the hybrid multirotor propulsion system 100 may comprise further operating modes deviating in some aspects from the standard hybrid power mode. Hereinafter, these additional operating modes are compared to the standard hybrid power mode referring to FIGS. 3 to 7, wherein FIG. 3 illustrates once again the standard hybrid power mode.

The different operating modes can be distinguished from each other in particular when comparing the flows of mechanical and electric power. In FIGS. 3 to 7, the flow of the first mechanical power component is denoted as "FMPC", the flow of the second mechanical power component is denoted as "SMPC", the flow of the respective first mechanical propeller power is denoted as "FMPP$_{1...n}$", the flow of the electric power output from the electric machine EM and the rechargeable electric power bank REPB, respectively, is denoted as "EP", and the flow of the respective electric propeller powers is denoted as "EPP$_{1...n}$".

Figure 3:
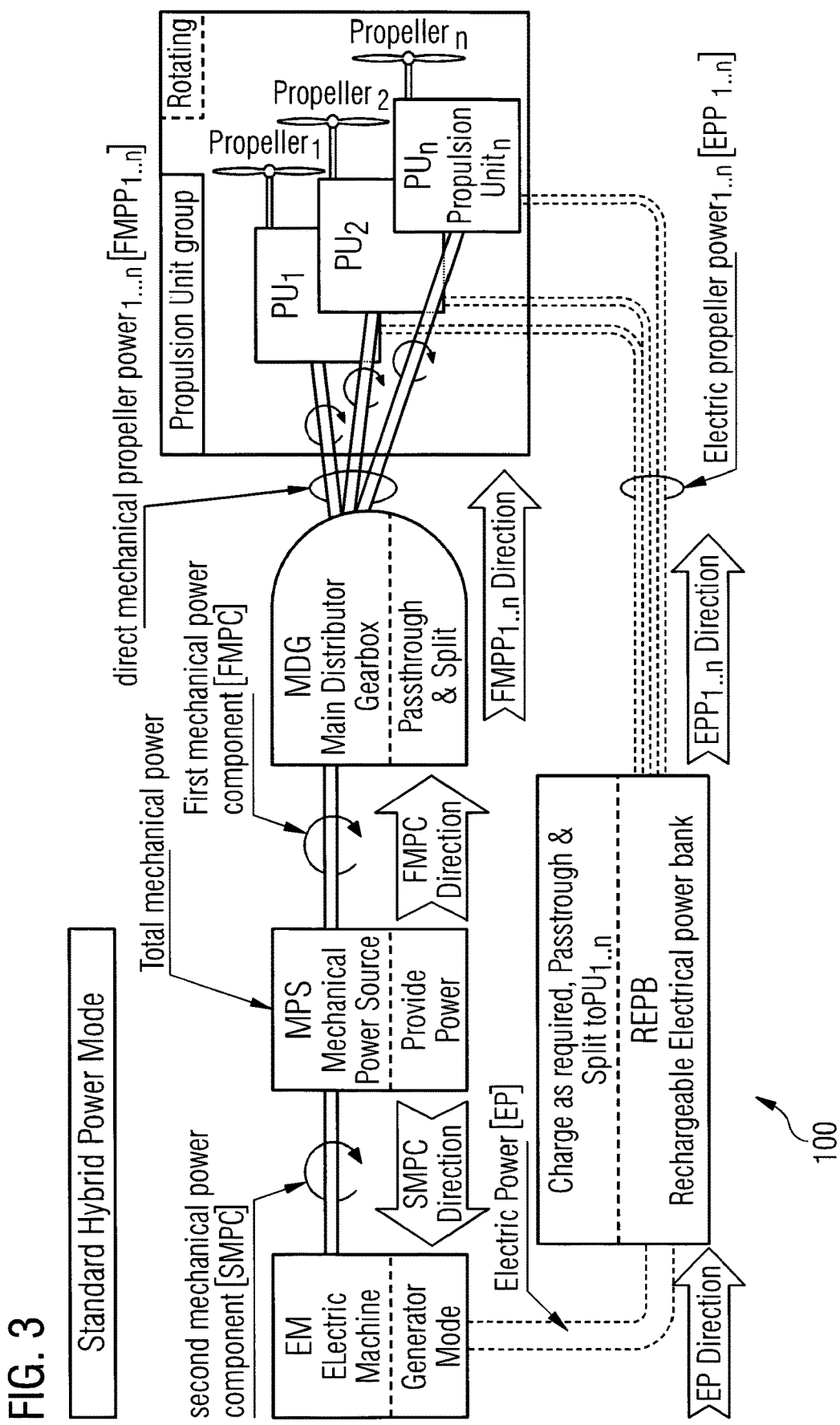
FIG. 3 is a block diagram illustrating a standard hybrid power mode of the hybrid multirotor propulsion system shown in FIG. 1.

As shown in FIG. 3, according to the standard hybrid power mode, the flow FMPC of the first mechanical power component is directed from the mechanical power source MPS to the main distributor gearbox MDG. Likewise, the flow SMPC of the second mechanical power component is directed from the mechanical power source MPS to the electric machine EM. The power flow FMPP$_{1...n}$ of the first mechanical propeller powers is directed from the main distributor gearbox MDG to the plurality of propulsion units PU$_1$ to PU$_n$. Further, the power flow EP of the electric power is directed from the electric machine EM to the rechargeable electrical power bank REPB (or to the electrical energy storing device in general). Finally, the power flow EPP$_{1...n}$ of the electric propeller power is directed from the main distributor gearbox MDG to the plurality of propulsion units PU$_1$ to PU$_n$.

Figure 4:
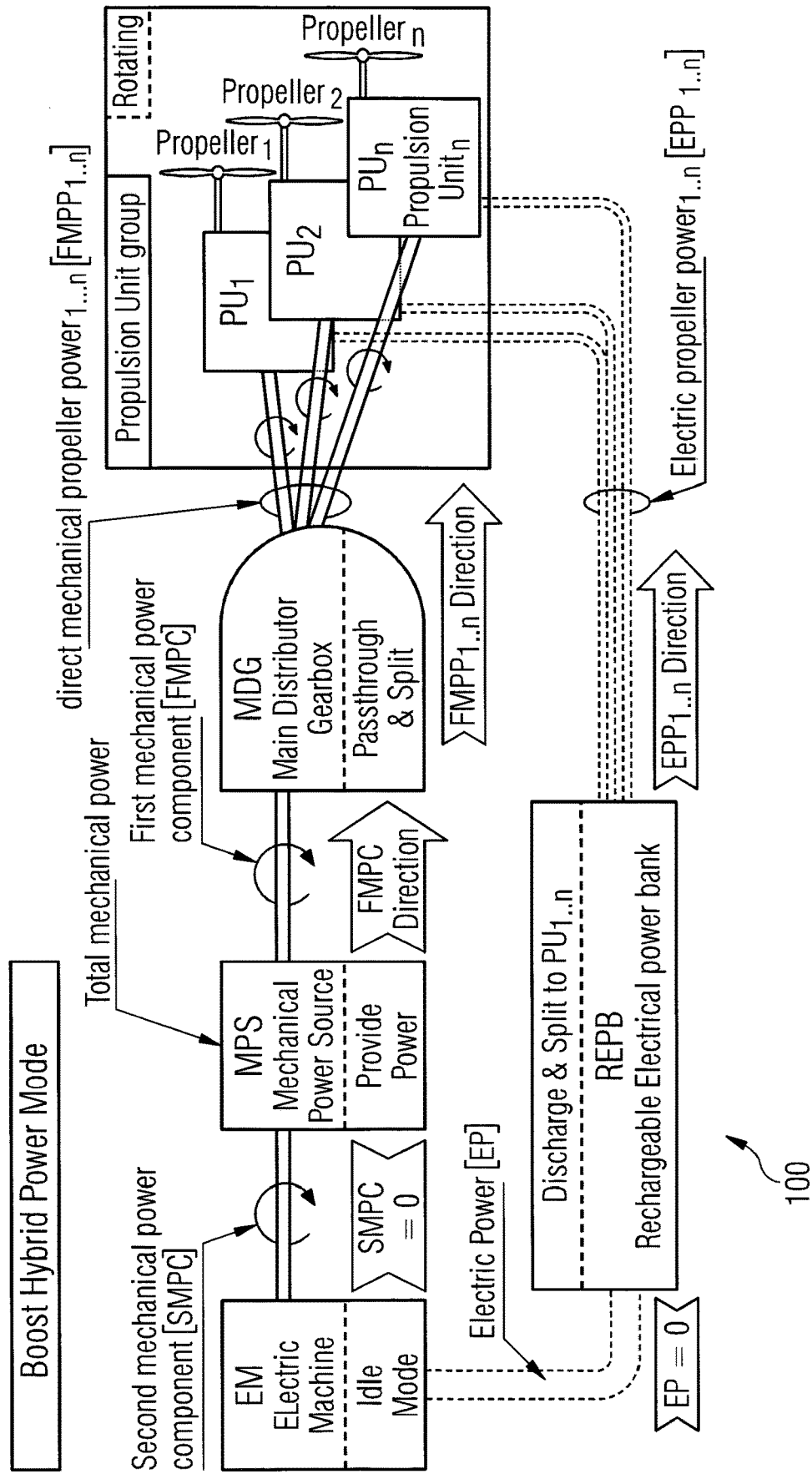
FIG. 4 is a block diagram illustrating a boost hybrid power mode of the hybrid multirotor propulsion system shown in FIG. 1.

FIG. 4 illustrates a boost hybrid power mode which differs from the standard hybrid power mode shown in FIG. 3 in terms of the power flow SMPC of the second mechanical power component and in terms of the power flow EP of electric power. Thus, according to the boost hybrid power mode being a short term operating mode, the electric machine EM is operated at least nearly in an idle mode so that the electric machine EM does not generate any electric power. Accordingly, the power flow SMPC of the second mechanical power component is zero, and the power flow EP of the electric power is zero. In the boost hybrid power mode of FIG. 4, the total mechanical power provided by the mechanical power source MPS is fully available for direct mechanical transmission up to the plurality of propulsion units PU$_1$ to PU$_n$. Accordingly, the rechargeable electric power bank REPB is not charged by the electric machine EM. However, as in the standard hybrid power mode, the rechargeable electrical power bank REPB is discharged to output the electric propeller powers to the plurality of propulsion units PU$_1$ to PU$_n$.

Figure 5:
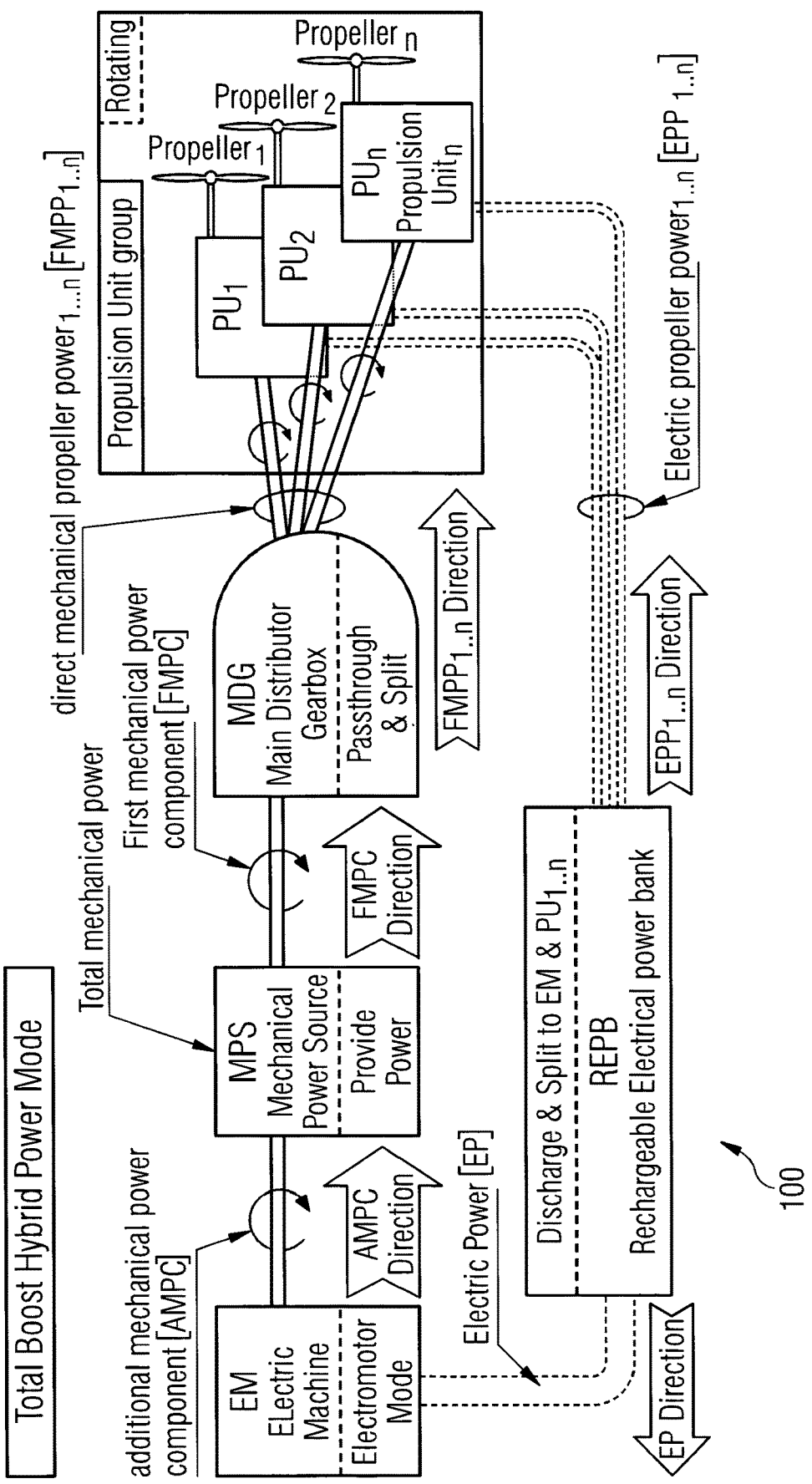
FIG. 5 is a block diagram illustrating a total boost hybrid power mode of the hybrid multirotor propulsion system shown in FIG. 1.

FIG. 5 illustrates a total boost hybrid power mode which is a short term operating mode and deviates from the standard hybrid power mode in terms of the power flow SMPC of the second mechanical power component and in terms of the power flow EP of the electric power. As in the boost hybrid power mode, the total mechanical power generated by the mechanical power source MPS is fully available for providing the first mechanical power component in order to establish a powerful direct transmission chain to the plurality of propulsion units PU$_1$ to PU$_n$. Accordingly, it is assumed that the second mechanical power component is zero in the total boost hybrid power mode. In contrast to the boost hybrid power mode, the electric machine EM is not operated idling in the total boost hybrid power mode. Rather, the electric machine EM is operated in electromotor mode receiving electric power from the rechargeable electrical power bank REPB. Thus, the electric machine EM provides additional mechanical power AMPC which is used to increase the first mechanical power component directly output to the propulsion units PU$_1$ to PU$_n$.

Figure 6:
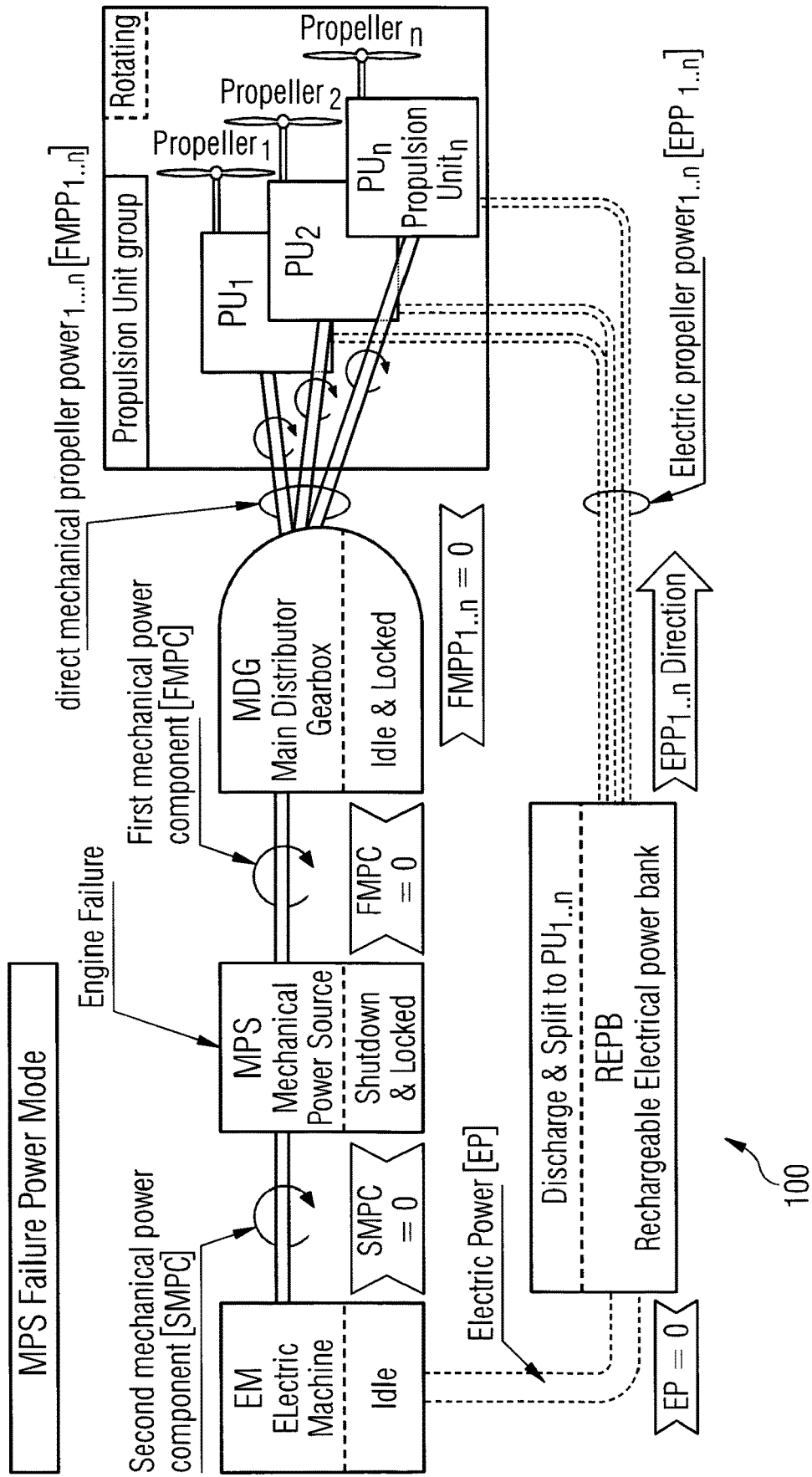
FIG. 6 is a block diagram illustrating a MPS power failure mode of the hybrid multirotor propulsion system shown in FIG. 1.

FIG. 6 illustrates an MPS failure power mode deviating from the standard hybrid power mode in terms of all power flows except from the flow EPP$_{1...n}$ of the electric propeller power. Thus, the MPS failure power mode refers to an emergency situation in which the mechanical power source MPS breaks down so that no mechanical power is available for driving the propulsion units PU$_1$ to PU$_n$. In such an emergency situation, the power management unit PMU causes the rechargeable electric power bank REPB to take over full responsibility for powering the plurality of propulsion units PU$_1$ to PU$_n$. Thus, the electrical energy stored in the rechargeable electric power bank REPB is output to the propulsion units PU$_1$ to PU$_n$, in order to continue operation of the system during a period which is required for emergency landing.

Figure 7:
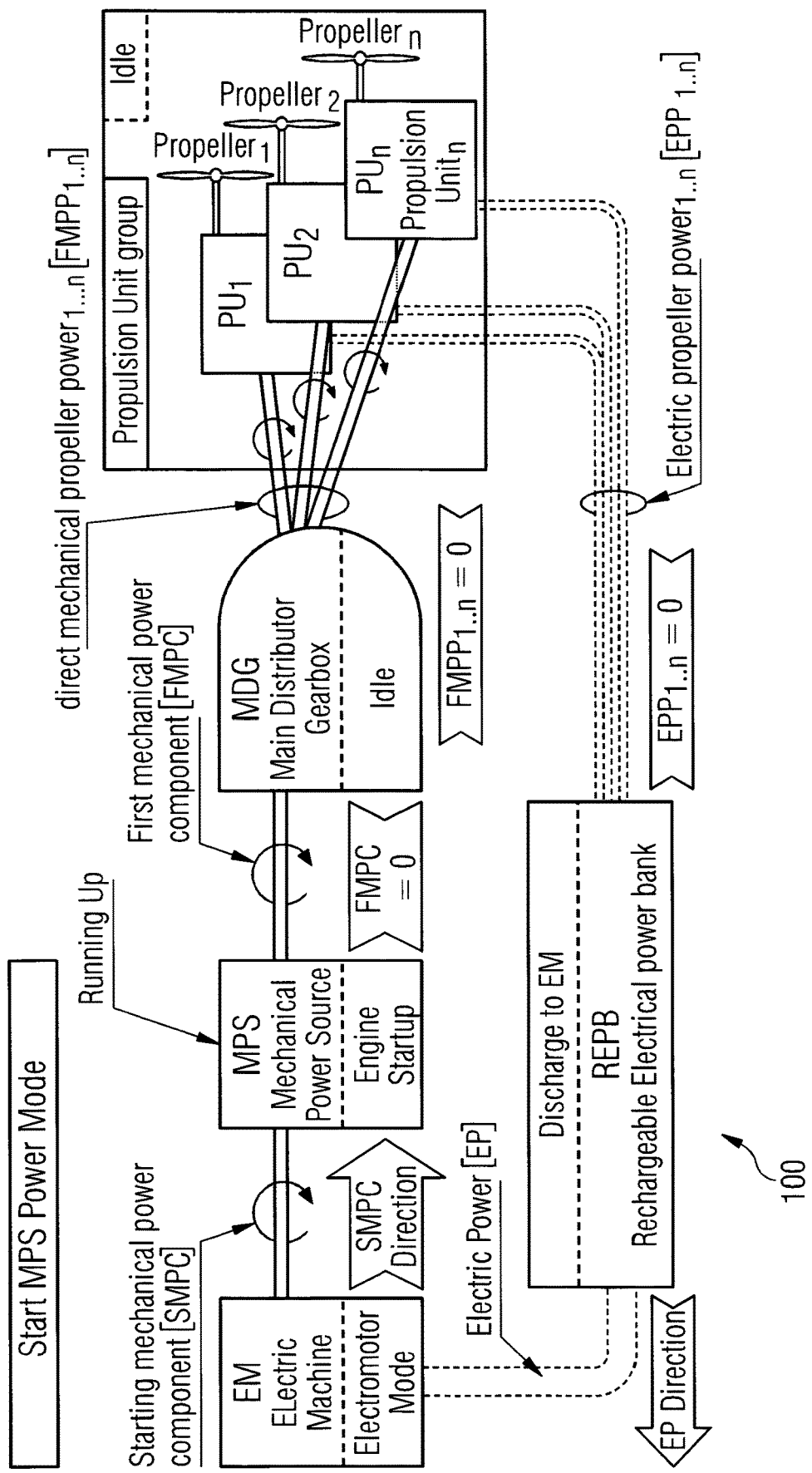
FIG. 7 is a block diagram illustrating a start MPS power mode of the hybrid multirotor propulsion system shown in FIG. 1.

FIG. 7 illustrates a start MPS power mode in which the electric machine EM is used as a starter for the mechanical power source MPS. Thus, it is assumed that the mechanical power source MPS has not yet started to generate mechanical power, i.e. the first and second mechanical power components are assumed to be zero in FIG. 7. The electric machine EM is operated in electromotor mode for outputting mechanical starting power (SMPC) to the mechanical power source MPS.

Figure 8:
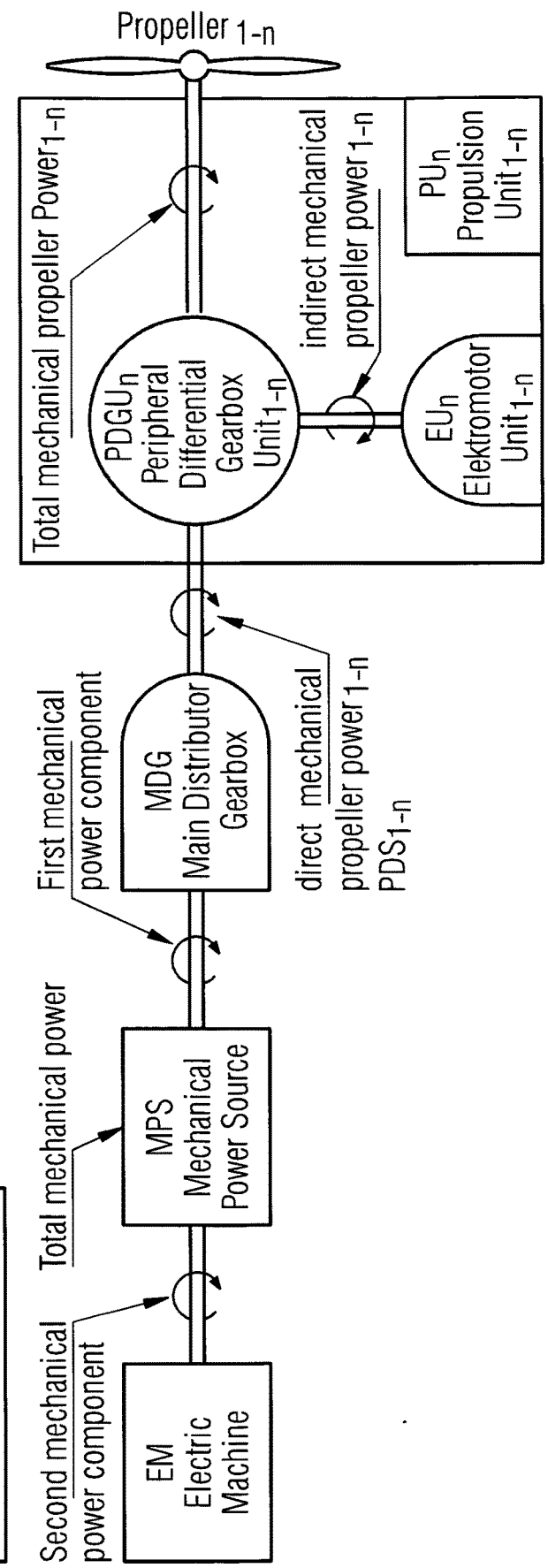
FIG. 8 is a block diagram illustrating several options for locating the electric machine within the hybrid multirotor propulsion system.

The block diagram of FIG. 8 illustrates exemplary configurations regarding the location of the electric machine EM within the hybrid multirotor propulsion system 100. In principle, the electric machine EM may be inserted and coupled anywhere in the mechanical power transmission line between the mechanical power source MPS and the propulsion units PU$_1$ to PU$_n$. It is to be noted that the electric machine EM may be a multipurpose machine of any type which is suitable to be operated by the power management unit PMU. Further, a plurality of electric machines EM may be integrated instead of only one electric machine. In case that the mechanical power source comprises a plurality of ICEs, each ICE might be associated with a separate electric machine EM.

FIG. 8a shows a configuration in which the mechanical power source MPS comprises a first power output coupled to the main distributor gearbox MDG and a second power output coupled to the electric machine EM. The second power output may be formed by a back shaft of the mechanical power source MPS for connecting the electric machine EM thereto. Whereas the first power output of the mechanical power source MPS serves to supply the first mechanical power component to the main distributor gearbox MDG, the second mechanical output of the mechanical power source MPS serves to supply the second mechanical power component to the electric machine EM. The configuration shown in FIG. 8a corresponds to the embodiment shown in FIG. 1. It is to be noted that the power management unit PMU and the rechargeable electric power bank REPB are omitted in FIG. 8a for sake of simplicity. This applies also to FIGS. 8b to 8d.

FIG. 8b shows a configuration in which the electric machine EM is coupled between the mechanical power source MPS and the main distributor gearbox MDG. Thus, the mechanical power source MPS outputs the total mechanical power in the amount of the first and second mechanical power components via a single power output. The electric machine EM derives from the total mechanical power the second mechanical power component in order to convert the second mechanical power component into electric energy supplied to the rechargeable electric power bank REPB (not shown in FIG. 8b). The first mechanical power component passes through the electric machine EM and is received from the main distributor gearbox MDG.

FIG. 8c shows a configuration in which the electric machine EM is coupled to the main distributor gearbox MDG. The mechanical power source MPS has a single power output supplying the main distributor gearbox MDG with the total mechanical power in the amount of the first and second mechanical power components. Apart from the plurality of power outputs of the main distributor gearbox MDG, each of which coupling the respective propulsion unit $PU_1$ to $PU_n$ to the main distributor gearbox MDG, the main distributor gearbox MDG comprises an additional power output for coupling the electric machine EM to the main distributor gearbox MDG. Thus, the main distributor gearbox MDG splits the total mechanical power received from the mechanical power source MPS into the first mechanical power component and the second mechanical power component. Whereas the first mechanical power component is distributed to the plurality of propulsion units $PU_1$ to $PU_n$ without applying power conversion, the additional power output of the main distributor gearbox MDG supplies the electric machine EM with the second mechanical power component for converting the second mechanical power component into electric power. Again, the electric power generated by the electric machine EM is transmitted to the rechargeable electric power bank (not shown in FIG. 8c).

FIG. 8d shows a configuration in which the electric machine EM is inserted in the power transmission line between the main distributor gearbox MDG and one of the plurality of propulsion units $PU_1$ to $PU_n$ (unit with index n in the example of FIG. 8d). As in the case of the configurations shown in FIGS. 8a to 8c, the main distributor gearbox MDG distributes the first mechanical power component received from the mechanical power source MPS to the plurality of peripheral differential gearbox units $PDGU_1$ to $PDGU_n$ of the propulsion units $PU_1$ to $PU_n$. However, according to the configuration shown in FIG. 8d, the main distributor gearbox MDG outputs the second mechanical power component received from the mechanical power source MPS to the single power transmission line connecting the main distributor gearbox MDG to the specific peripheral differential gearbox unit $PDGU_n$. The electric machine EM converts the second mechanical power component received from the main distributor gearbox MDG into electric power and outputs the electric power to the rechargeable electric power bank REPB (not shown in FIG. 8d). From the rechargeable electric power bank REPB, the electric power is distributed to the plurality of electromotor units $EU_1$ to $EU_n$ of the propulsion units $PU_1$ to $PU_n$.

Figure 9:
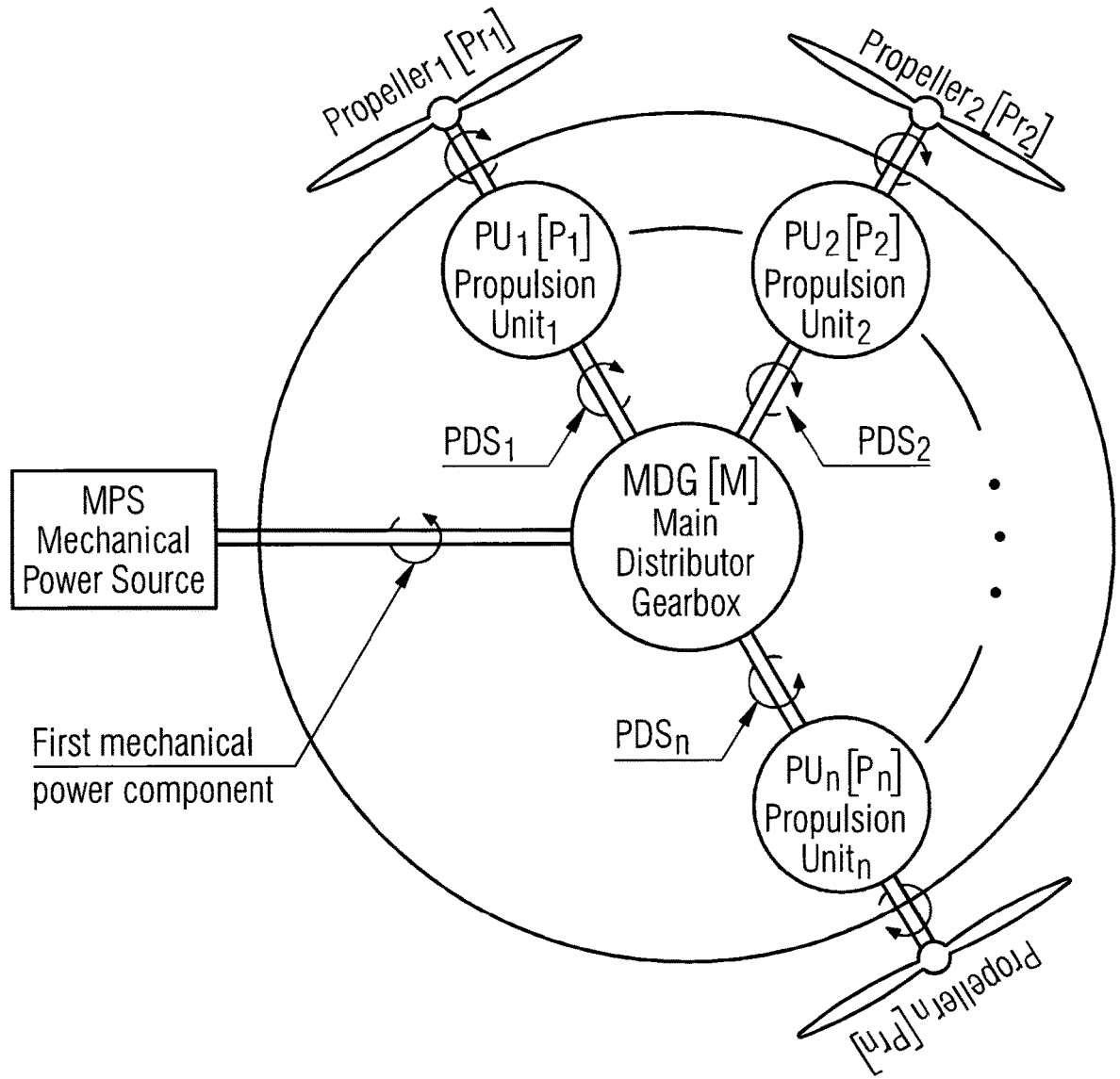
FIG. 9 is a diagram illustrating a star-like configuration of the distributor gearbox according to an embodiment.

Various configurations for implementing the main distributor gearbox MDG are conceivable. FIGS. 9 and 10 show exemplary configurations which may be considered as star-like and tree-like configuration, respectively.

According to a star-like configuration shown in FIG. 9, the main distributor gearbox MDG comprises a root gearbox M having an input coupled to the mechanical power source MPS. The root gearbox M comprises a plurality of outputs which are connected to the propulsion units $PU_1$ to $PU_n$ trough the driving elements $PDS_1$ to $PDS_n$. The root gearbox M distributes the received first mechanical power component via the driving elements $PDS_1$ to $PDS_n$ directly to the different propulsion units $PU_1$ to $PU_n$.

Figure 10A:
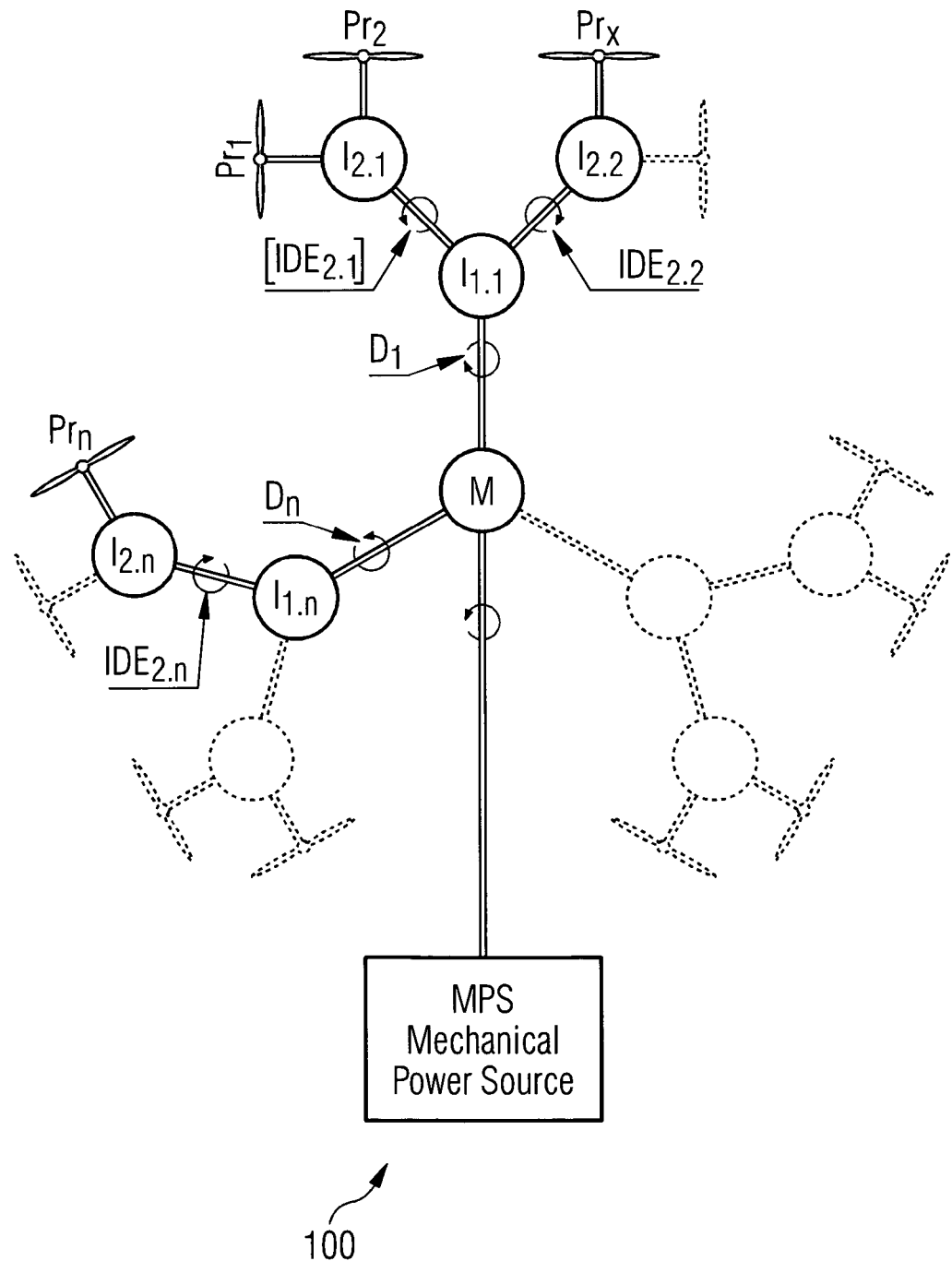
FIG. 10 is a diagram illustrating two tree-like configurations of the distributor gearbox according to another embodiment.
Figure 10B:
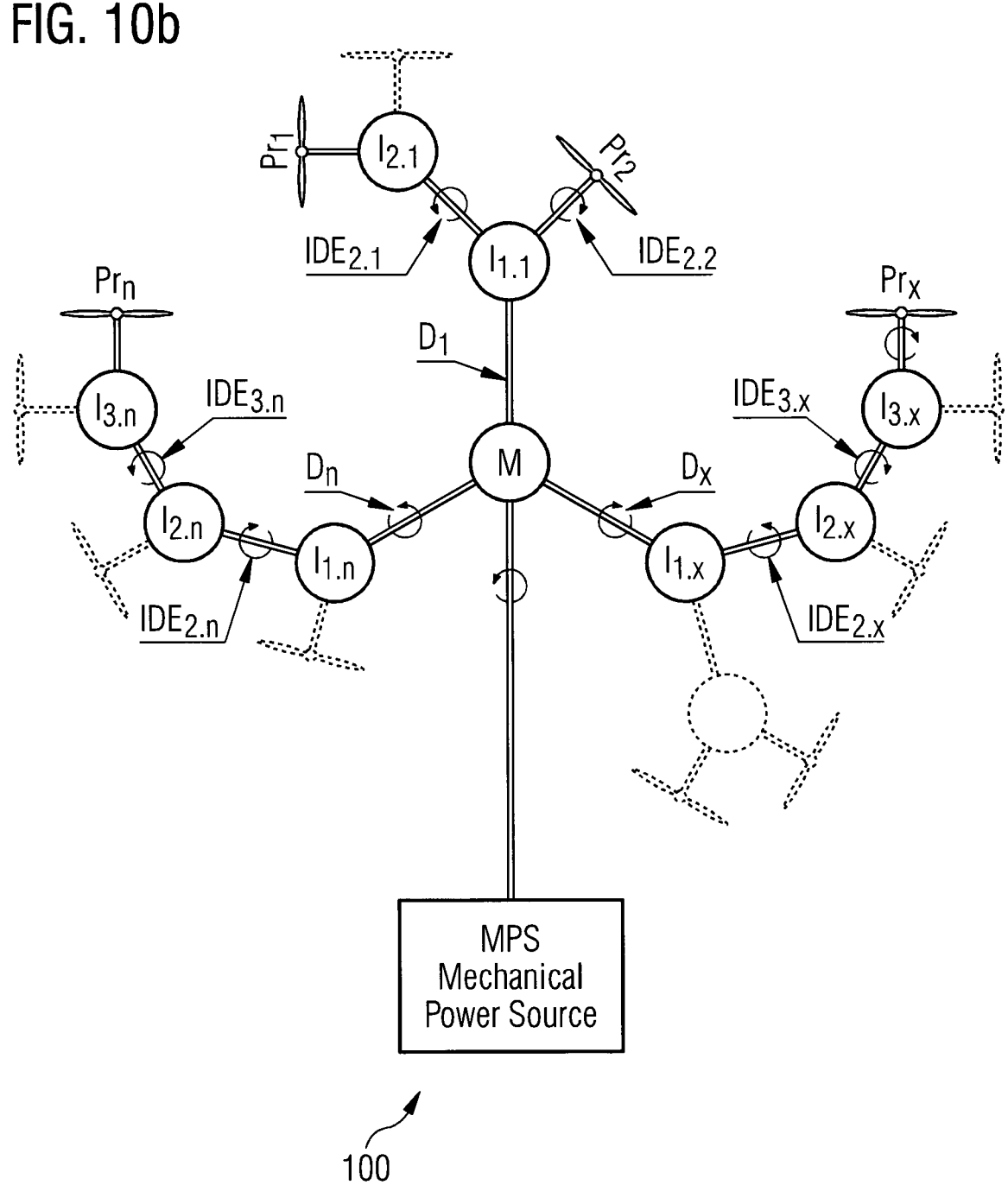

Whereas according to the embodiment shown in FIG. 9, the driving elements $PDS_1$ to $PDS_n$ directly connect the outputs of the root gearbox M to the propulsion units $PU_1$ to $PU_n$, tree-like configurations shown in FIGS. 10a and 10b provide for an indirect coupling between the root gearbox M and the plurality of propulsion units $PU_1$ to $PU_n$.

According to the embodiment shown in FIG. 10a, the main distributor gearbox MDG comprises a plurality of secondary gearboxes $I_{1.1}$ to $I_{1.n}$ defining a first branching level and a plurality secondary gearboxes $I_{2.1}$ to $I_{2.n}$ defining a second branching level. Each secondary gearbox $I_{1.1}$ to $I_{1.n}$ of the first branching level has an input which is connected through a driving shaft $D_1$ to $D_n$ to the respective output of the root gearbox M. Further, each secondary gearbox $I_{1.1}$ to $I_{1.n}$ of the first branching level has two outputs, each of which being connected through a driving shaft $IDE_{2.1}$ to $IDE_{2.n}$ to an input of one of the secondary gearboxes $I_{2.1}$ to $I_{2.n}$ of the second branching level. Finally, each secondary gearbox $I_{2.1}$ to $I_{2.n}$ of the second branching level has two outputs, each of these two outputs being connected with a respective one of the driving elements (not explicitly shown in FIG. 10a). In the configuration shown in FIG. 10a, the first mechanical power component received by the root gearbox M from the mechanical power source MPS is distributed in two branching levels to the plurality of propellers $Pr_1$ to $Pr_n$. When considering e.g. the propeller $Pr_1$ in FIG. 10a, a portion of the first mechanical power component is transferred from the root gearbox M to the secondary gearbox $I_{1.1}$ and from there to the secondary gearbox $I_{2.1}$ which supplies the propeller $Pr_1$ with the mechanical power.

The embodiment shown in FIG. 10a comprises a symmetrical configuration, i.e. each power transmission line from the root gearbox M to the respective propeller comprises two splitting stages for distributing the mechanical power received from the root gearbox M. However, it is also possible that the different power transmission lines comprise different numbers of splitting stages as exemplarily illustrated in FIG. 10b. Here, the power transmission line leading to the propeller $Pr_1$ comprises two splitting stages, whereas the power transmission line leading to the propeller $Pr_x$ comprises three splitting stages.

According to the embodiments shown in FIGS. 9 and 10, the first mechanical power component received by the root gearbox M is distributed in accordance with fixed transmission ratios to the plurality of propellers $Pr_1$ to $Pr_n$. Accordingly, it is possible to used simple mechanical splitters instead of differential gearboxes.

The invention claimed is:

1. A hybrid multirotor propulsion system for an aircraft, comprising:
   a plurality of propulsion units (PU), each propulsion unit (PU) comprising a propeller (Pr), an electromotor (EU) and a peripheral differential gearbox (PDGU);
   a plurality of driving elements (PDS), each of which being coupled to a respective one of said plurality of propulsion units (PU);
   a mechanical power source (MPS);
   a main distributor gearbox (MDG);
   at least one electric machine (EM); and
   a power management unit (PMU);
   wherein said power management unit (PMU) is configured according to a predetermined operating mode:
      to cause said mechanical power source (MPS) to output total mechanical power and to cause said total mechanical power to be split into first and second mechanical power components;
      to cause said main distributor gearbox (MDG) to distribute said first mechanical power component to said plurality of driving elements (PDS) for providing each driving element (PDS) with a direct mechanical propeller power;
      to cause said electric machine (EM) to convert said second mechanical power component into electric power and to cause at least a part of said electric power to be distributed to said plurality of electromotors (EU) for providing each electromotor (EU) with an electric propeller power;
      to cause each driving element (PDS) to output said direct mechanical propeller power to said peripheral differential gearbox (PDGU) of said propulsion unit (PU) to which said driving element (PDS) is coupled;
      to cause each electromotor (EU) to convert said electric propeller power into an indirect mechanical propeller power and to output said indirect mechanical propeller power to said peripheral differential gearbox (PDGU) of said propulsion unit (PU) comprising said electromotor (EU); and
      to cause said peripheral differential gearbox (PDGU) of each propulsion unit (PU) to aggregate said direct mechanical propeller power and said indirect mechanical propeller power to a total mechanical propeller power and to drive said propeller (Pr) of each propulsion unit (PU) based on said total mechanical propeller power.

2. The hybrid multirotor propulsion system according to claim 1, further comprising an electrical energy storing device which is connected to said electric machine (EM) and to said plurality of electromotors (EU), wherein said power management unit (PMU) is configured to cause said electrical energy storing device to store said electric power generated by said electric machine (EM) and to distribute at least a part of said stored electric power to said plurality of electromotors (EU).

3. The hybrid multirotor propulsion system according to claim 2, wherein said electrical energy storing device comprises at least one capacitor unit (CU) and/or at least one rechargeable battery.

4. The hybrid multirotor propulsion system according to claim 2, further comprising a mechanical power source failure mode in which said power management unit (PMU) is configured to cause said electrical energy storing device to output electric power to said plurality of electromotors (EU).

5. The hybrid multirotor propulsion system according to claim 1, wherein said mechanical power source (MPS) comprises first and second power outputs, and
   wherein said power management unit (PMU) is configured to cause said mechanical power source (MPS) to output said first mechanical power component from said first power output to said main distributor gearbox (MDG) and to cause said mechanical power source (MPS) to output said second mechanical power component from said second power output to said electric machine (EM).

6. The hybrid multirotor propulsion system according to claim 1, wherein said mechanical power source (MPS) comprises a single power output,
   wherein said power management unit (PMU) is configured to cause said mechanical power source (MPS) to output said total mechanical power from said single power output to one of said main distributor gearbox (MDG) and said electric machine (EM), and
   wherein said power management unit (PMU) is configured to cause said one of said main distributor gearbox (MDG) and said electric machine (EM) to split said total mechanical power into said first and second mechanical power components.

7. The hybrid multirotor propulsion system according to claim 1, wherein said main distributor gearbox (MDG) comprises a plurality of power outputs, each of which being coupled to a respective one of said plurality of drive elements.

8. The hybrid multirotor propulsion system according to claim 7, wherein said electric machine (EM) is coupled to one of said plurality of power outputs of said main distributor gearbox (MDG).

9. The hybrid multirotor propulsion system according to claim 7, wherein said main distributor gearbox (MDG) comprises an additional power output, and
   wherein said electric machine (EM) is coupled to said additional power output of said main distributor gearbox (MDG).

10. The hybrid multirotor propulsion system according to claim 1, wherein said power management unit (PMU) is configured to control each peripheral differential gearbox (PDGU) based on a variable ratio of said direct and indirect mechanical propeller powers.

11. The hybrid multirotor propulsion system according to claim 1, wherein said power management unit (PMU) is configured to vary said indirect mechanical propeller power, said indirect mechanical propeller power being smaller than said direct mechanical propeller power.

12. The hybrid multirotor propulsion system according to claim 1, wherein said electric machine (EM) is configured to be operated both in a generator mode for converting said second mechanical power component into electric power and in an electromotor mode for converting electric power stored in said electrical energy storing device into mechanical power.

13. The hybrid multirotor propulsion system according to claim 12, further comprising a start power mode in which said power management unit (PMU) is configured to operate said electric machine (EM) in said electromotor mode to output mechanical starting power for starting said mechanical power source (MPS).

14. The hybrid multirotor propulsion system according to claim 1, wherein said predetermined operating mode is a standard hybrid power mode in which said power management unit (PMU) is configured to cause said electric machine (EM) to be operated in a generator mode.

15. The hybrid multirotor propulsion system according to claim 14, further comprising a boost hybrid power mode differing from said standard hybrid power mode in that said power management unit (PMU) is configured to cause said second mechanical power component to be zero and said electric machine (EM) to be operated in an idle mode.

16. The hybrid multirotor propulsion system according to claim 14, further comprising a total boost hybrid power mode differing from said standard hybrid power mode in that said power management unit (PMU) is configured to cause said second mechanical power component to be zero and said electric machine (EM) to be operated in said electromotor mode for providing mechanical power and increasing said first mechanical power component.

17. The hybrid multirotor propulsion system according to any one of the preceding claim 1, wherein said main distributor gearbox (MDG) comprises a root gearbox (M) which has a gearbox input coupled to said mechanical power source (MPS) and a plurality of gearbox outputs, each of which being directly or indirectly coupled to a respective one of said plurality of driving elements (PDS).

18. The hybrid multirotor propulsion system according to claim 17, wherein said main distributor gearbox (MDG) has a branched gearbox configuration defining successive branching levels for indirectly coupling said root gearbox to said driving elements (PDS), wherein a lowest branching level is defined by said root gearbox and at least one higher branching level is defined by a plurality of secondary gearboxes,
  wherein each secondary gearbox comprises a gearbox input coupled to a respective one of said gearbox outputs assigned to lower branching level, and
  wherein each secondary gearbox comprises at least two gearbox outputs, each of which being coupled to a respective one of said gearbox inputs assigned to a higher branching level or being coupled to a respective one of said driving elements (PDS).

19. The hybrid multirotor propulsion system according to claim 1, wherein said mechanical power source comprises at least one internal combustion engine.

20. Method for controlling power in a hybrid multirotor propulsion system of an aircraft, said hybrid multirotor propulsion system comprising:

a plurality of propulsion units (PU), each propulsion unit (PU) comprising a propeller, an electromotor (EU) and a peripheral differential gearbox (PDGU);
a plurality of driving elements (PDS), each of which being coupled to a respective one of said plurality of propulsion units (PU);
a mechanical power source (MPS);
a main distributor gearbox (MDG); and
at least one electric machine (EM);
wherein said method comprises the following steps:
  causing said mechanical power source (MPS) to output total mechanical power and splitting said total mechanical power into first and second mechanical power components;
  causing said main distributor gearbox (MDG) to distribute said first mechanical power component to said plurality of driving elements (PDS) (PDS) for providing each driving element (PDS) with a direct mechanical propeller power;
  causing said electric machine (EM) to convert said second mechanical power component into electric power and distributing at least a part of said electric power to said plurality of electromotors (EU) for providing each electromotor (EU) with an electric propeller power;
  causing each driving element (PDS) to output said direct mechanical propeller power to said peripheral differential gearbox (PDGU) of said propulsion unit (PU) to which said driving element (PDS) is coupled;
  causing each electromotor (EU) to convert said electric propeller power into an indirect mechanical propeller power and to output said indirect mechanical propeller power to said peripheral differential gearbox (PDGU) of said propulsion unit (PU) comprising said electromotor (EU), and
  causing said peripheral differential gearbox (PDGU) of each propulsion unit to aggregate said direct mechanical propeller power and said indirect mechanical propeller power to a total mechanical propeller power and to drive said propeller of each propulsion unit based on said total mechanical propeller power.

* * * * *